United States Patent
Kim et al.

(10) Patent No.: US 8,204,023 B2
(45) Date of Patent: Jun. 19, 2012

(54) CQI REPORTING METHOD AND APPARATUS FOR MOBILE TELECOMMUNICATION SYSTEM

(75) Inventors: Young Bum Kim, Seoul (KR); Youn H. Heo, Suwon-si (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 143 days.

(21) Appl. No.: 12/539,285

(22) Filed: Aug. 11, 2009

(65) Prior Publication Data

US 2010/0034114 A1 Feb. 11, 2010

(30) Foreign Application Priority Data

Aug. 11, 2008 (KR) ........................ 10-2008-0078575

(51) Int. Cl.
*H04W 4/00* (2009.01)
(52) U.S. Cl. ........ 370/332; 370/320; 370/335; 370/343; 370/437
(58) Field of Classification Search .................. 370/217, 370/320, 332, 335, 343, 437
See application file for complete search history.

(56) References Cited

U.S. PATENT DOCUMENTS

| 6,591,113 | B1 * | 7/2003 | Mortensen | 455/522 |
|---|---|---|---|---|
| 6,940,839 | B2 * | 9/2005 | Miyamoto | 370/335 |
| 7,054,288 | B2 * | 5/2006 | Sternberg et al. | 370/329 |
| 7,133,688 | B2 * | 11/2006 | Das et al. | 455/522 |
| 7,236,474 | B2 * | 6/2007 | Seo et al. | 455/522 |
| 7,242,956 | B2 * | 7/2007 | Ratasuk et al. | 455/522 |
| 7,251,229 | B2 * | 7/2007 | Montojo et al. | 370/335 |
| 7,813,272 | B2 * | 10/2010 | Seki | 370/229 |
| 8,081,972 | B2 * | 12/2011 | Chan et al. | 455/434 |
| 2003/0123396 | A1 * | 7/2003 | Seo et al. | 370/252 |
| 2005/0201295 | A1 | 9/2005 | Kim et al. | |
| 2006/0099985 | A1 * | 5/2006 | Whinnett et al. | 455/522 |

FOREIGN PATENT DOCUMENTS

| JP | 2008-035158 | 2/2008 |
|---|---|---|
| KR | 1020050077516 | 8/2005 |
| KR | 1020050091573 | 9/2005 |
| KR | 1020060091163 | 8/2006 |
| KR | 10-0625143 | 9/2006 |
| KR | 1020080032744 | 4/2008 |
| WO | WO 2007024950 A2 * | 3/2007 |

* cited by examiner

*Primary Examiner* — Ricky Ngo
*Assistant Examiner* — Dewanda Samuel
(74) *Attorney, Agent, or Firm* — The Farrell Law Firm, P.C.

(57) ABSTRACT

A CQI reporting method for a Dual-Cell HSDPA service of a mobile communication system is provided for reducing CQI reporting overhead. A user terminal transmits channel quality indicators for downlink channels in a mobile communication system, measures channel qualities of a first downlink channel and a second downlink channel, compares the channel qualities of the first and second downlink channels with each other, selects at least one channel quality of the first and second downlink channels, and transmits at least one channel quality indicator indicating the at least one channel quality.

20 Claims, 16 Drawing Sheets

CQI REPORTING METHOD AND APPARATUS FOR MOBILE TELECOMMUNICATION SYSTEM

PRIORITY

This application claims priority under 35 U.S.C. §119(a) to an application entitled "CQI REPORTING METHOD AND APPARATUS FOR MOBILE TELECOMMUNICATION SYSTEM SUPPORTING DUAL-CELL HSDPA SERVICE" filed in the Korean Intellectual Property Office on Aug. 11, 2008 and assigned Serial No. 10-2008-0078575 the content of which is incorporated herein by reference.

BACKGROUND OF THE INVENTION

1. Field of the Invention

The present invention relates generally to a mobile communication system and more particularly, to a Channel Quality Indicator (CQI) reporting method for a Dual-Cell High Speed Downlink Packet Access (HSDPA) service of a mobile communication system that is capable of reducing CQI reporting overhead.

2. Description of the Related Art

Universal Mobile Telecommunications System (UMTS), which is one of the Third Generation (3G) mobile telecommunication technologies based on the Wideband Code Division Multiple Access (WCDMA), has evolved from Global System for Mobile communications (GSM) and General Packet Radio Services (GPRS), and provides mobile and computer users with packet-based multimedia services including text messaging and voice and video communication services in a consistent service environment.

The UMTS system supports HSDPA service in order to enhance packet data transfer speed and capacity in the downlink.

In order to secure a high-speed data transfer rate, HSDPA uses Adaptive Modulation and Coding (AMC) and Hybrid Automatic Repeat reQuest (HARQ). The Quadrature Phase-Shift Keying (QPSK), 16 Quadrature Amplitude Modulation (16QAM), and 64QAM modulation schemes are selectively used with the AMC. The AMC technique selects the modulation scheme, coding format and coding rate based on a channel condition and channel type between the base station and the User Equipment (UE) so as to improve throughput of the entire cell.

HARQ is implemented with fast retransmission and soft combining techniques. When an erroneous packet is detected, the retransmission is triggered between the base station and the UE. The recipient part combines the retransmitted packet with the previously received packets, thereby reducing the number of retransmission requests and improving overall efficiency. In order to support the HSDPA service, the base station and the UE exchange control information such as Orthogonal Variable Spreading Factor (OVSF) codes, number of OVSF codes, Transport Block Size (TBS), Modulation and Coding Scheme (MCS), channel index information for HARQ, CQI for indicating the channel condition, and HARQ ACK/NACK.

FIG. 1 is a sequence diagram illustrating operations of HSDPA system comprising a cell and a UE.

Referring to FIG. 1, a UE 102 first transmits a CQI to a cell 101. Since the UE 102 does not know when data is transmitted in the downlink, it transmits the CQI information periodically in step 103. When there is data to be sent, cell (or Node B) 101 performs scheduling based on the CQI. In the scheduling process, Node B determines a number of code channels available for allocation and an MCS level. Such information is transmitted to the UE 102 through a High Speed-Shared Control Channel (HS-SCCH) in step 105. The HS-SCCH is received by the UE 102 in a Transmission Time Interval (TTI), and the UE 102 receives data by demodulating the High Speed-Physical Downlink Shared Channel (HS-PDSCH) in step 106 with reference to the HS-SCCH. In order to make a status report for HARQ, the UE 102 performs a Cyclic Redundancy Check (CRC) to determine Acknowledgement/Non-Acknowledgement (ACK/NACK) in step 106-1. If the data is received in error, the UE 102 transmits a NACK to Node B 101 to request retransmission of the data; and otherwise, transmits an ACK to Node B 101 in step 107. The status reports of ACK/NACK of step 107 and periodic CQI of step 108 are transmitted through the High Speed-Dedicated Physical Control Channel (HS-DPCCH).

FIG. 2 is a timing diagram illustrating transmissions of the physical channels of an HSDPA system. As shown in FIG. 2, CQIs 205, 206, and 207 are periodically transmitted via the HS-DPCCH. Node B transmits two slots of HS-SCCH 201 before it begins transmitting HS-PDSCH 202 in order for the UE to check the information on the demodulation of the HS-PDSCH. ACK/NACK information 204 is transmitted 7.5 slots 203 after the transmission of the HS-PDSCH 202 in consideration of the demodulation and decoding of the data carried by the HS-PDSCH 202.

Dual-Cell HSDPA operation is described hereinafter with reference to FIG. 3. Unlike the conventional HSDPA in which the UE measures received signal strengths of the cells and connects to the most appropriate cell based on the measurements, the Dual-Cell HSDPA is characterized in that a UE 308 connects to two different cells 301 and 302 defined by two different carriers 303 and 304 of a Node B. The UE 308 receives the HSDPA signals 306 from the first cell 301 in the first carrier f1 304 and HSDPA signals 307 from the second cell 302 in the second carrier f2 303, simultaneously. In the WCDMA system, the transmission bandwidth of a cell is 5 MHz such that the UE must have a reception capability of 10 MHz for supporting Dual-Cell HSDPA. Since the HSDPA signals are received from two cells, the maximum transmission rate is doubled. In case of uplink, however, the Dual-Cell transmission function is not supported, whereby the uplink channel 308 is transmitted to only one cell. Even in downlink transmission, common and dedicated channels that are not related to the HSDPA are received from a single cell. Typically, the cell that is in charge of controlling the uplink channel and common and dedicated downlink channels is referred to as an "anchor cell" and the other cell is referred to as a "supplementary cell". Although a description is provided with two cells (two carriers), the Dual-Cell HSDPA system can be implemented with multiple supplementary cells and an anchor cell. In order for the Dual-Cell HSDPA service to support the HARQ and AMC, the ACK/NACK and CQI should be transmitted to the respective cells, whereby the uplink channel permitted for the anchor cell must be configured to carry the ACK/NACKs and CQIs destined for the anchor and supplementary cells. A simple approach to achieve this includes code multiplexing in which two codes are assigned to the uplink for the anchor cell. This approach is simple but is problematic in that the increment of a number of channels to be transmitted increases a Peak to Average Power Ratio (PAPR) ratio, resulting in a reduction of uplink coverage.

SUMMARY OF THE INVENTION

The present invention has been made to address at least the above problems and/or disadvantages and to provide at least the advantages described below. Accordingly, an aspect of the present invention provides a CQI reporting method for a Dual-Cell HSDPA service of a mobile communication system that is capable of reducing CQI transmission overhead by reporting the channel conditions of anchor and supplementary cells with the least number of CQI based on a difference between the two CQIs for the anchor and supplementary cells at every CQI feedback time point.

Another aspect of the present invention provides a CQI reporting method for a Dual-Cell HSDPA service of a mobile communication system that is capable of improving CQI feedback reliability by adjusting the transmit power of the uplink physical channels in a transmission priority when the sum of transmit power of the uplink physical channels exceeds a maximum allowable transmit power of the UE.

According to one aspect of the present invention, a method for reporting channel quality indicators for a downlink channel in a mobile communication system is provided. Channel quality of a first downlink channel and channel quality of a second downlink channel are measured. The channel quality of the first downlink channel and the channel quality of the second downlink channel are compared with each other. At least one of the channel quality of the first downlink channel and the channel quality of the second downlink channel is selected. One or more channel quality indicators are transmitted indicating the at least one channel quality.

According to another aspect of the present invention, a method for receiving channel quality indicators for downlink channels in a mobile communication system is provided. When at least one channel quality indicator is received, a maximum correlation value of a channel quality indicator for a first uplink channel and a maximum correlation value of a channel quality indicator for a second uplink channel are selected. It is determined whether a Discontinuous Transmission is enabled for the maximum correlation value of each channel quality indicator. When the Discontinuous Transmission is enabled for the maximum correlation values of both channel quality indicators, the channel quality indicators for the first and second uplink channels with the maximum correlation values are acquired. When the Discontinuous Transmission is enabled for one of the maximum correlation values, the channel quality indicator for the uplink channels with the maximum correlation value for which Discontinuous Transmission is disabled is acquired. Data is scheduled in accordance with the acquired channel quality indicators.

According to a further aspect of the present invention, an apparatus for transmitting channel quality indicators for downlink channels in a mobile communication system is provided. The apparatus includes a first measurer, which measures a channel quality for a first downlink channel, and a second measurer, which measures a channel quality for a second downlink channel. The apparatus also includes a channel quality indicator controller, which compares the channel quality measured by the first measure and the channel quality measured by the second measurers and selects at least one of the channel qualities according to the comparison result. The apparatus further includes a control channel transmitter which transmits at least one channel quality indicator indicating the at least one channel qualities.

According to an additional aspect of the present invention, an apparatus for receiving channel quality indicators for downlink channels in a mobile communication system is provided. The apparatus includes a detector, which detects a channel quality indicator for a first uplink channel and a channel quality indicator for a second uplink channel. The apparatus also includes a channel quality indicator analyzer which receives the detected channel quality indicators, selects maximum correlation values of channel quality indicators for a first uplink channel and a second uplink channel, acquires the channel quality indicators for the first and second uplink channels with the maximum correlation values, when Discontinuous Transmission is enabled for the maximum correlation values of both channel quality indicators, and acquires the channel quality indicator for the uplink channels with the maximum correlation value for which Discontinuous Transmission is disabled, when the Discontinuous Transmission is enabled for one of maximum correlation values of both channel quality indicators. The apparatus further includes a scheduler, which schedules data on the basis of the acquired channel quality indicators.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
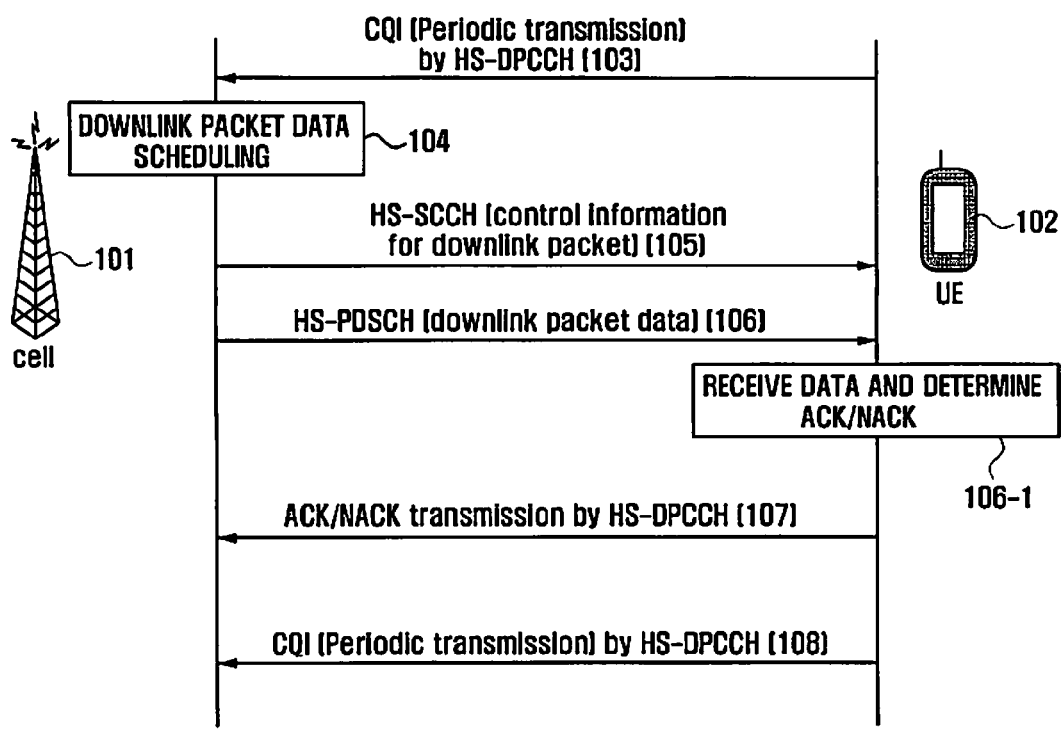
FIG. 1 is a sequence diagram illustrating operations of HSDPA system comprising a cell and a UE.
Figure 2:
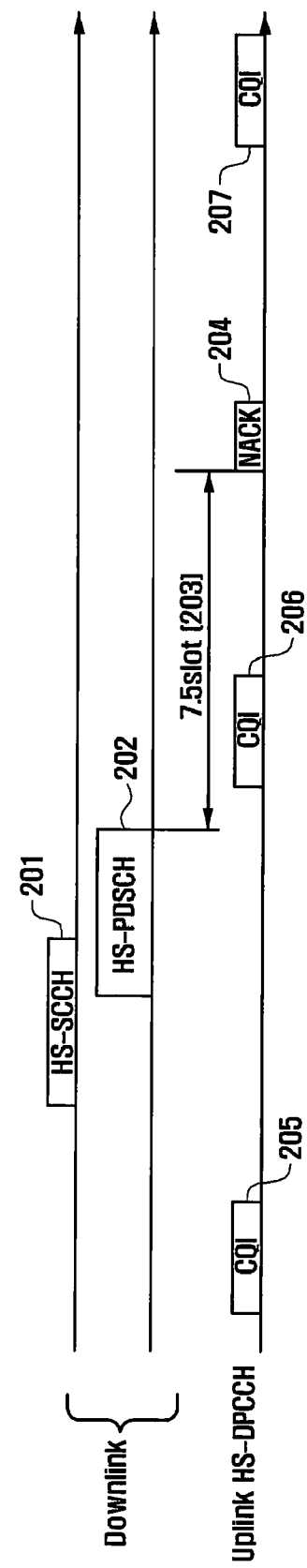
FIG. 2 is a timing diagram illustrating transmissions of the physical channels of an HSDPA system.
Figure 3:
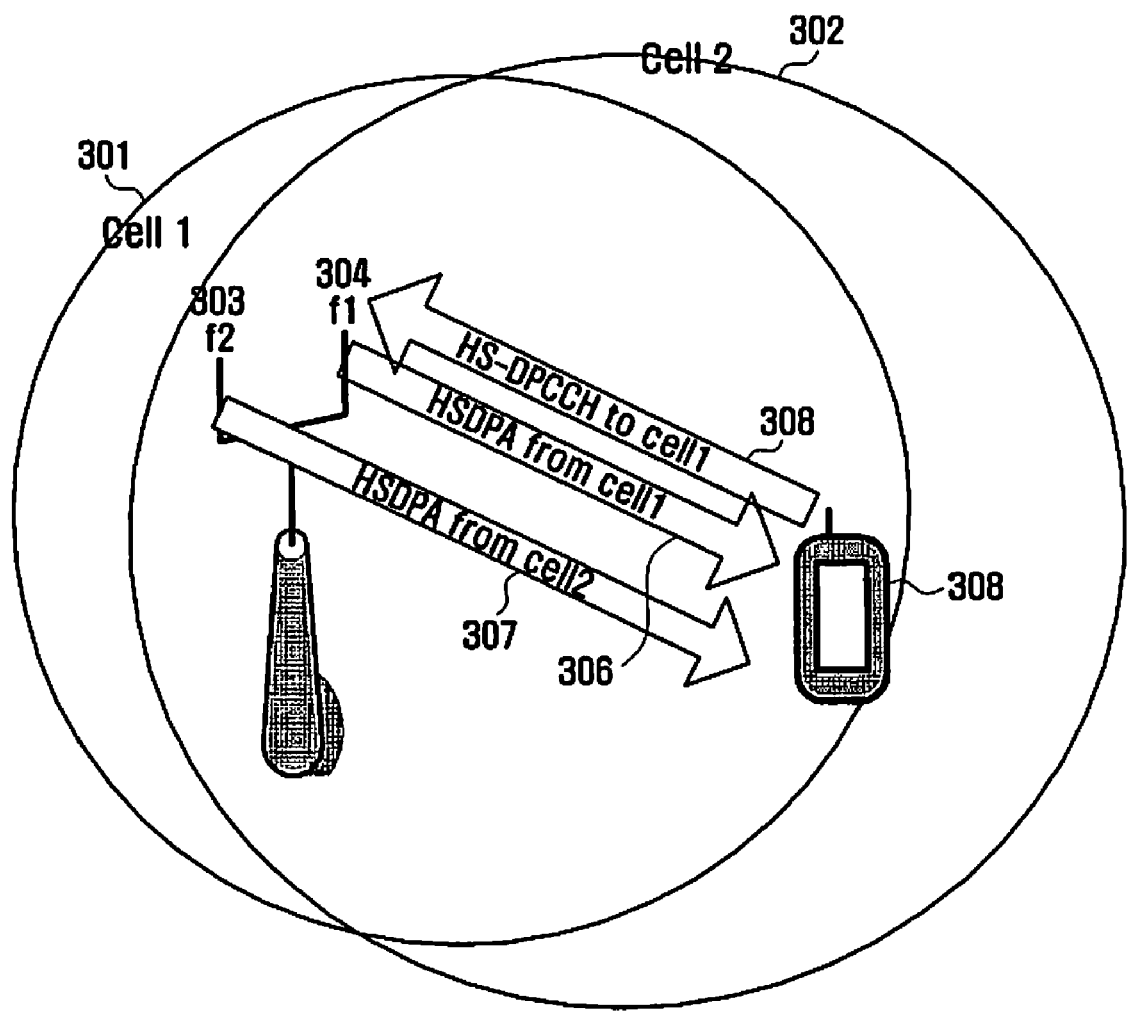
FIG. 3 is a diagram illustrating a Dual-Cell HSDPA service of a UMTS system.

Embodiments of the present invention are described in detail with reference to the accompanying drawings. The same or similar reference numbers may be used throughout the drawings to refer to the same or similar parts. Detailed descriptions of constructions or processes known in the art may be omitted to avoid obscuring the subject matter of the present invention.

The terms used in the following description are defined in consideration of the corresponding functions in the present invention and thus can be replaced with other words according to the intention and practice of a user and an operator. Accordingly, the definitions of the terms should be made based on the content of the entire description of the present invention.

In the following description, a CQI reporting method and apparatus for UE is provided to reduce the CQI reporting overhead in the HSDPA system supporting a Dual-Cell HSDPA service. However, the present invention is not limited thereto. For example, the CQI reporting method and apparatus of the present invention can be applied to a High Speed Uplink Packet Access (HSUPA) system.

In an embodiment of the present invention, the UE operating in Dual-Cell HSDPA mode, in which two CQIs (CQI(1) for the anchor cell and CQI(2) for the supplementary cell) are used, transmits only one of CQI(1) and CQI(2) when the difference between channel conditions or the MCS levels of the downlink channels for the anchor and supplementary cells is equal to or less than a predetermined value. This single transmission prevents the PAPR of the UE from increasing and thus maintains the uplink radio coverage. When a single CQI is fed back, Node B, which expects to receive two CQIs at a CQI feedback time, can know that the channel conditions or MCS levels of the anchor and supplementary carriers (anchor and supplementary cells) are similar to each other, thereby scheduling the data fairly across the anchor and supplementary cells. When the difference between CQI(1) and CQI(2) is greater than the threshold value, the UE transmits CQI(1) and CQI(2) via respective code channels simultaneously for scheduling efficiency. Node B schedules the data for the anchor and supplementary cells on the basis of the CQIs received through the respective code channels.

In another embodiment of the present invention, the UE operating in Dual-Cell HSDPA mode determines whether the difference between the channel conditions or MCS levels of the downlink channels is greater than another threshold value. When the difference is greater than the threshold value, the UE transmits the CQI of the channel having a channel condition or MCS that is relatively good compared to that of the other channel, thereby achieving the same effect as aforementioned embodiment. Since the CQI of the channel having the channel condition or MCS level that is relatively bad is not expected to help the scheduling operation, it is not transmitted to avoid unnecessary resource waste. Node B can know that the channel condition of the channel having an unreceived CQI is bad compared to a channel condition of the channel having a received CQI. When the difference between CQI(1) and CQI(2) is equal to or less than the threshold value, the UE transmits both CQI(1) and CQI(2) via respective code channels simultaneously for scheduling efficiency. Node B schedules the data for the anchor and supplementary cells on the basis of the CQIs received through the respective code channels.

In a further embodiment of the present invention, when the UE attempts to transmit two CQIs (CQI(1) for the anchor cell and CQI(2) for the supplementary cell) and a sum of the transmit power of all physical channels at an instance is greater than a maximum allowable transmit power, the UE adjusts the transmit powers of CQI(1) and CQI(2) in an order of priority so as to limit the sum of the transmission powers of all the physical channels to the maximum allowable transmit power. If the sum of the transmit powers of all physical channels exceed the maximum allowable transmit power after the adjustment of the transmit powers of CQI(1) and CQI(2), the UE decreases the transmit powers of the respective physical channels equally to the maximum allowable transmit power. When the maximum allowable transmit power of the UE is not enough, the UE maintains the transmit power of the CQI channel of which channel condition or MCS level is relatively high compared to that of the other CQI channel while adjusting the transmit power of the other channel, rather than increasing the reception error probability at the anchor cell by decreasing the transmit powers of the channels for both CQI(1) and CQI(2), thereby maintaining the CQI error probability for at least one cell, i.e. the anchor cell.

First Embodiment

In a first embodiment of the present invention, the UE operating in Dual-Cell HSDPA mode, in which a CQI(1) for the anchor cell and a CQI(2) for the supplementary cell are used, compares the difference between the channel conditions or MCS levels of two downlink channels with threshold#1. One of CQI(1) and CQI(2) is transmitted to Node B when the difference is equal to or less than threshold#1. Both CQI(1) and CQI(2) are transmitted to Node B when the difference is greater than threshold#1.

Figure 4:
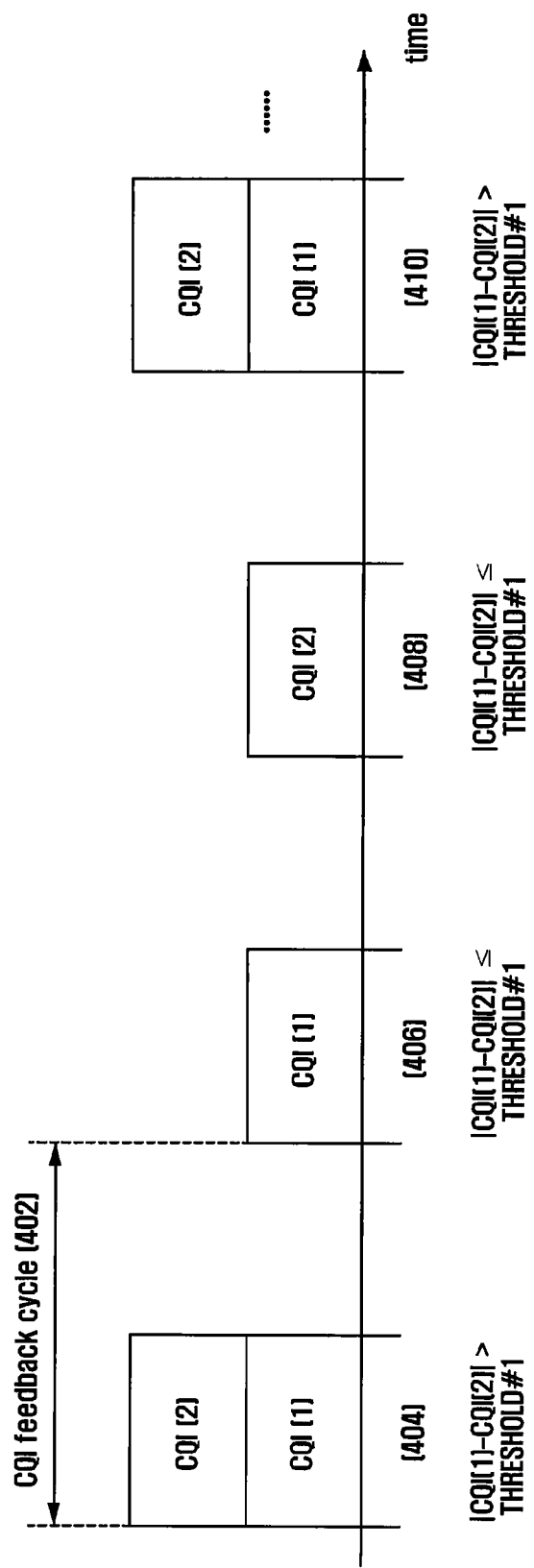
FIG. 4 is a diagram illustrating the CQI reporting method for a Dual-Cell HSDPA service in a mobile communication system, according to an embodiment of the present invention.

The concept of CQI reporting according to the first embodiment of the present invention is described with reference to FIG. 4. FIG. 4 is a diagram illustrating the CQI reporting method for a Dual-Cell HSDPA service in a mobile communication system, according to the first embodiment of the present invention.

In FIG. 4, the CQI feedback cycle can be set by higher layer signaling. The UE first calculates the difference between CQI(1) and CQI(2) and compares the difference with threshold#1 at each CQI feedback time point. At CQI feedback time point 904, the UE determines that the difference is greater than threshold#1. The UE transmits CQI(1) and CQI(2) to Node B through corresponding physical channels. The CQI is transmitted through a HS-DPCCH that is an uplink control channel for supporting the HSDPA service. In this embodiment, the HS-DPCCH for transmitting CQI(1) is referred to as HS-DPCCH1, and the HS-DPCCH for transmitting CQI(2) is referred to as HS-DPCCH2. HS-DPCCH1 and HS-DPCCH2 can be code-multiplexed or phase-multiplexed.

At CQI feedback time point 406, the UE determines that the difference between CQI(1) and CQI(2) is less than or equal to threshold#1 and transmits CQI(1). The difference between CQI(1) and CQI(2) is tiny but the channel condition or MCS level corresponding to CQI(1) is relatively low compared to that corresponding to CQI(2). By transmitting the CQI that is relatively high compared to the other CQI, it is possible to protect scheduling overhead.

At CQI feedback time point 408, the UE determines that the difference between CQI(1) and CQI(2) is less than or equal to thereshold#1 and transmits CQI(2). This means that the difference between CQI(1) and CQI(2) is tiny but a channel condition or MCS level corresponding to CQI(2) is lower than that corresponding to CQI(1).

At CQI feedback time point 410, the UE determines that the difference between CQI(1) and CQI(2) is greater than threshold#1 and thus transmits both CQI(1) and CQI(2) through the respective HS-DPCCH1 and HS-DPCCH2.

Figure 5:
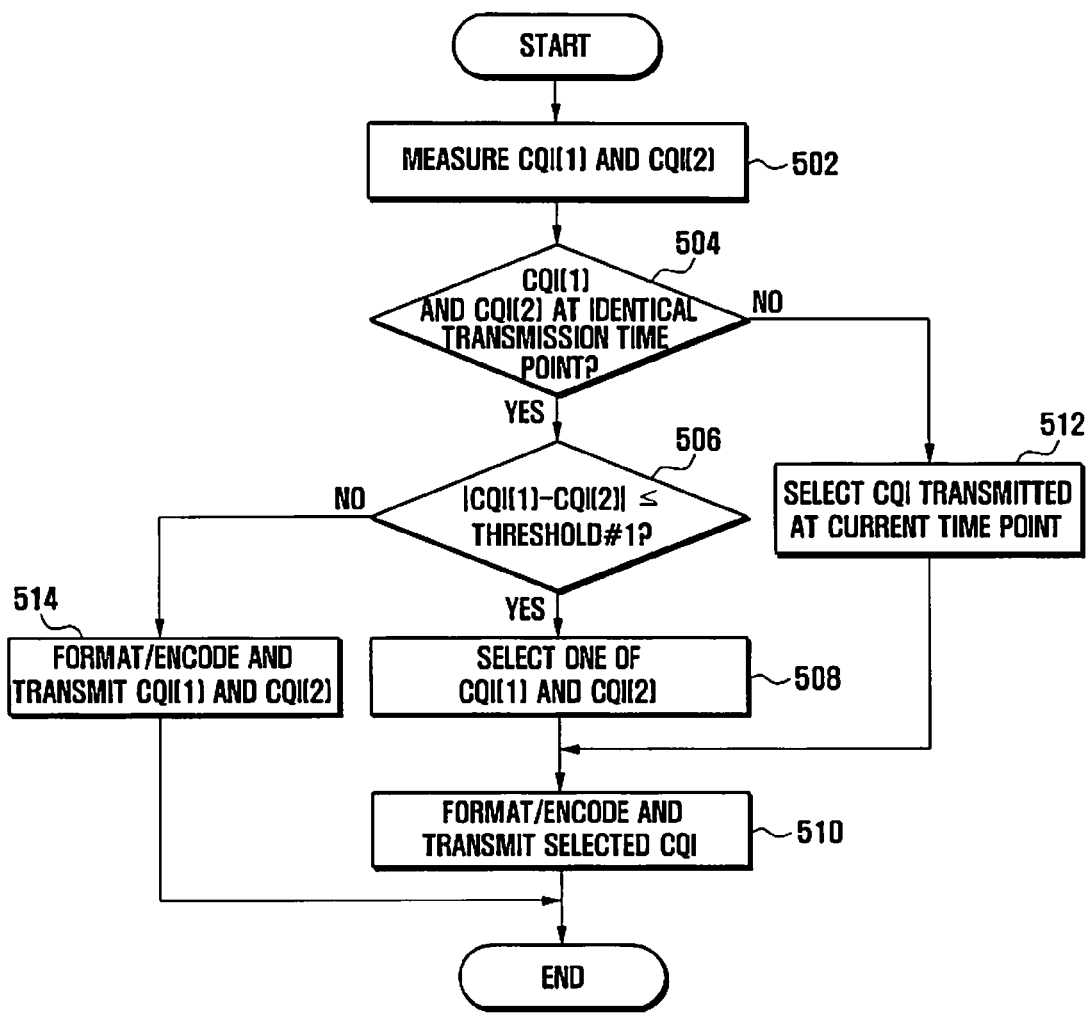
FIG. 5 is a flowchart illustrating a CQI reporting method for a Dual-Cell HSDPA service in a mobile communication system, according to an embodiment of the present invention.

FIG. 5 is a flowchart illustrating a CQI reporting method for a Dual-Cell HSDPA service in a mobile communication system, according to the first embodiment of the present invention.

Referring to FIG. 5, the UE first measures the Common Pilot Channel (CPICH) powers of the anchor and supplementary cells, determines the channel conditions and MCS levels based on the measurements, and generates CQI(1) and CQI(2) for the anchor and supplementary cells in step 502. Next, the UE determines whether the transmission time points of CQI(1) and CQI(2) are identical with each other in step 504. If the transmission time points of CQI(1) and CQI(2) are identical with each other, the UE calculates the difference between CQI(1) and CQI(2) and determines whether the difference is less than or equal to threshold #1 (the first threshold value) in step 506. Threshold#1 can be set by higher layer signaling or to a fixed value. If the difference between CQI(1) and CQI(2) is less than or equal to threshold#1, the UE selects one of CQI(1) and CQI(2) in step 508. The UE selects the CQI having a channel condition that is bad or MCS level that is low compared to that of the other CQI. Once one of CQI(1) and CQI(2) is selected, the UE performs formatting and channel encoding on the selected CQI and transmits the encoded CQI through a corresponding HS-DPCCH in step 510. If the transmission time points of CQI(1) and CQI(2) are different from each other at step 504, the UE selects the CQI having a transmission time that is reached in step 512 and transmits the selected CQI after formatting and channel coding in step 510. If the difference between CQI(1) and CQI(2) is greater than threshold#1, the UE performs formatting and channel coding on CQI(1) and CQI(2) and transmits channel coded CQI(1) and CQI(2) through respective HS-DPCCH1 and HS-DPCCH2 simultaneously. Table 1 is a CQI mapping table showing a TBS, a modulation scheme, and a number of HS-PDSCH that are mapped with 31 CQIs specified in a current HSDPA standard specification. For example, the UE refers to Table 1 to retrieve CQIs corresponding to the channel conditions measured for respective cells and determines whether to transmit one or both of the CQIs based on the correlation between the CQIs.

TABLE 1

| CQI value | Transport Block Size | Number of HS-PDSCH | Modulation |
|---|---|---|---|
| 0 | N/A | Out of range | |
| 1 | 136 | 1 | QPSK |
| 2 | 176 | 1 | QPSK |
| 3 | 232 | 1 | QPSK |
| 4 | 320 | 1 | QPSK |
| 5 | 376 | 1 | QPSK |
| 6 | 464 | 1 | QPSK |
| 7 | 648 | 2 | QPSK |
| 8 | 792 | 2 | QPSK |
| 9 | 928 | 2 | QPSK |
| 10 | 1264 | 3 | QPSK |
| 11 | 1488 | 3 | QPSK |
| 12 | 1744 | 3 | QPSK |
| 13 | 2288 | 4 | QPSK |
| 14 | 2592 | 4 | QPSK |
| 15 | 3328 | 5 | QPSK |
| 16 | 3576 | 5 | 16-QAM |
| 17 | 4200 | 5 | 16-QAM |
| 18 | 4672 | 5 | 16-QAM |
| 19 | 5296 | 5 | 16-QAM |
| 20 | 5896 | 5 | 16-QAM |
| 21 | 6568 | 5 | 16-QAM |
| 22 | 7184 | 5 | 16-QAM |
| 23 | 9736 | 7 | 16-QAM |
| 24 | 11432 | 8 | 16-QAM |
| 25 | 14424 | 10 | 16-QAM |
| 26 | 15776 | 10 | 64-QAM |
| 27 | 21768 | 12 | 64-QAM |
| 28 | 26504 | 13 | 64-QAM |
| 29 | 32264 | 14 | 64-QAM |
| 30 | 32264 | 14 | 64-QAM |

Figure 6:
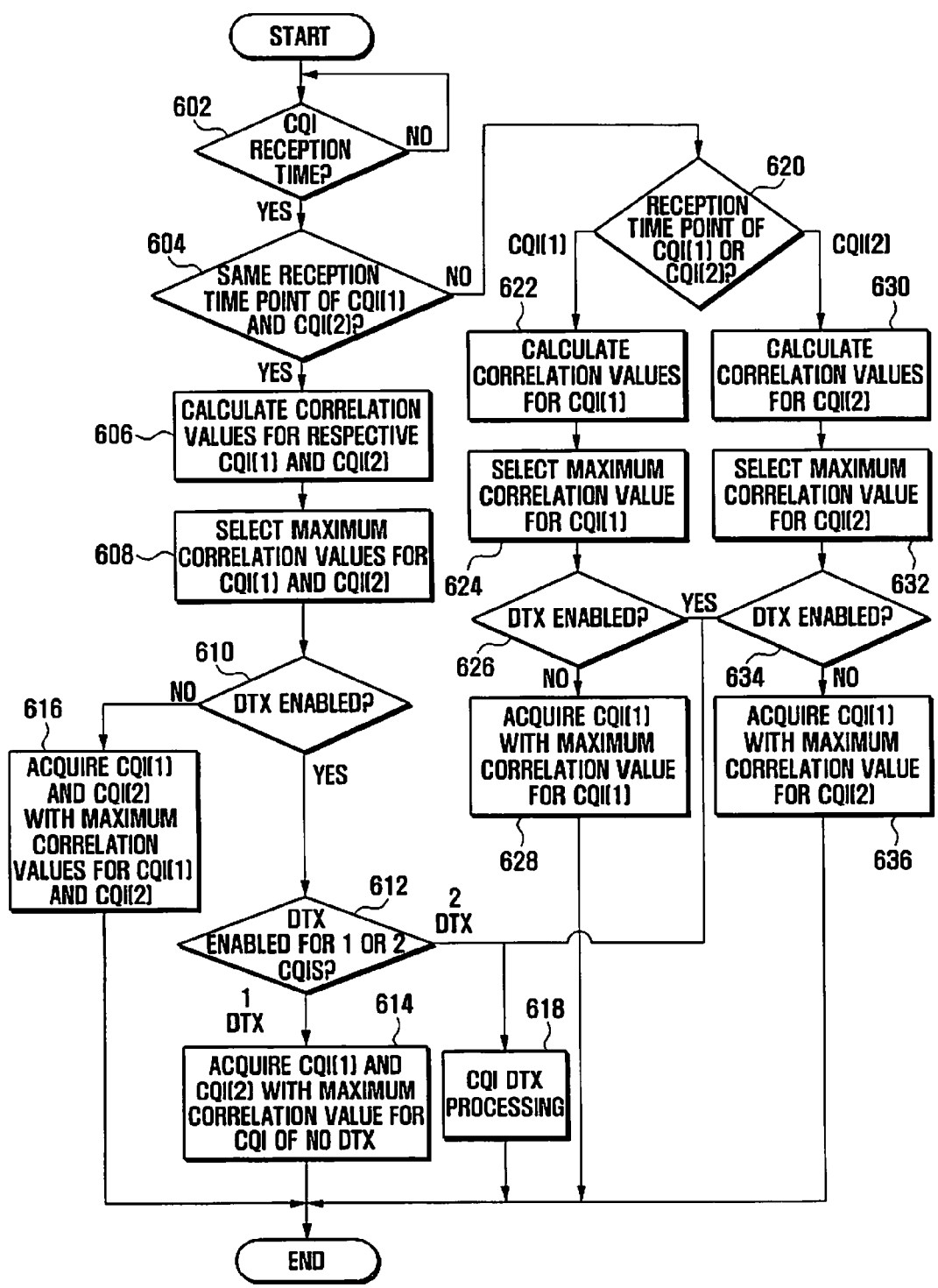
FIG. 6 is a flowchart illustrating a CQI receiving method for a dual cell HSDPA service in a mobile communication system, according to an embodiment of the present invention.

FIG. 6 is a flowchart illustrating a CQI receiving method for a dual cell HSDPA service in a mobile communication system, according to the first embodiment of the present invention. During the Dual-Cell HSDPA operation, the anchor and supplementary cells are defined by two different carriers of a single Node B.

Referring to FIG. 6, Node B determines whether a CQI reception time point is reached in step 602. If it is not a CQI reception time point, Node B waits and determines whether the reception time points of CQI(1) and CQI(2) are identical with each other in step 604 when a CQI reception time point is reached. If the reception time points of CQI(1) and CQI(2) are identical with each other, Node B calculates correlation values of codewords predefined for each of CQI(1) and CQI(2) to the respective signals received in step 606. Next, Node B selects maximum correlation values for CQI(1) and CQI(2) in step 608 and determines whether Discontinuous Transmission (DTX) is enabled for CQI(1) and CQI(2) in step 610. The DTX determination is performed by comparing the maximum correlation value of each of CQI(1) and CQI(2) with a first CQI reception threshold (threshold#1). If the maximum correlation value for each CQI is less than threshold#1, the DTX is enabled. If it is determined that the DTX is disabled for both CQI(1) and CQI(2) at step 610, Node B acquires CQI(1) and CQI(2) with the maximum correlation values for CQI(1) and CQI(2) in step 616. Node B determines that CQI codewords generating the maximum correlation values as the CQIs for the respective cells. If it is determined that the DTX is enabled for at least one of CQI(1) and CQI(2) at step 610, Node B determines whether the DTX is enabled for one or both of CQI(1) or CQI(2) in step 612. If it is determined that the DTX is enabled for one of CQI(1) and CQI(2), Node B acquires both CQI(1) and CQI(2) using the maximum correlation value for the CQI for which the DTX is disabled in step 614. This means that a single CQI is used for the anchor and supplementary cells. If it is determined that the DTX is enabled for both CQI(1) and CQI(2), Node B processes the CQI DTX without CQI information (CQI DTX processing) in step 618. In DTX processing, Node B determines the most recent successfully received CQIs or the values obtained by IIR filtering of the most recent successfully received CQIs as the current CQIs for the respective cells.

Returning to step 604 of FIG. 6, if the reception time points of CQI(1) and CQI(2) are different from each other, Node B determines whether it is time to receive CQI(1) or CQI(2) in step 620. If it is time to receive CQI(1), Node B calculates the correlation values for CQI(1) in step 622 and selects the maximum correlation value for CQI(1) among the calculated correlation values in step 624. Next, Node B determines whether the CQI DTX is enabled for CQI(1) in step 626. If the CQI DTX is enabled, Node B performs CQI DTX processing in step 618. The DTX determination is performed by comparing the maximum correlation value of CQI(1) with threshold#1 as aforementioned. If the maximum correlation value for CQI(1) is less than threshold#1, this means that the DTX is enabled for CQI(1). If the CQI DTX is disabled at step 626, Node B acquires CQI(1) from the maximum correlation value for CQI(1) in step 628.

Returning to step 620, if it is time to receive CQI(2), Node B calculates the correlation values for CQI(2) in step 630 and selects the maximum correlation value for CQI(2) among the calculated correlation values in step 632. Node B determines whether the CQI DTX is enabled in step 634. If the CQI DTX is enabled for CQI(2), Node B performs the CQI DTX processing in step 618. The DTX determination is done by comparing the maximum correlation value of CQI(2) with threshold#1 as aforementioned. If the maximum correlation value for CQI(2) is less than threshold#1, this means that the DTX is enabled for CQI(2). If the CQI DTX is disabled at step 634, Node B acquires CQI(2) from the maximum correlation value for CQI(2) in step 636.

Figure 7:
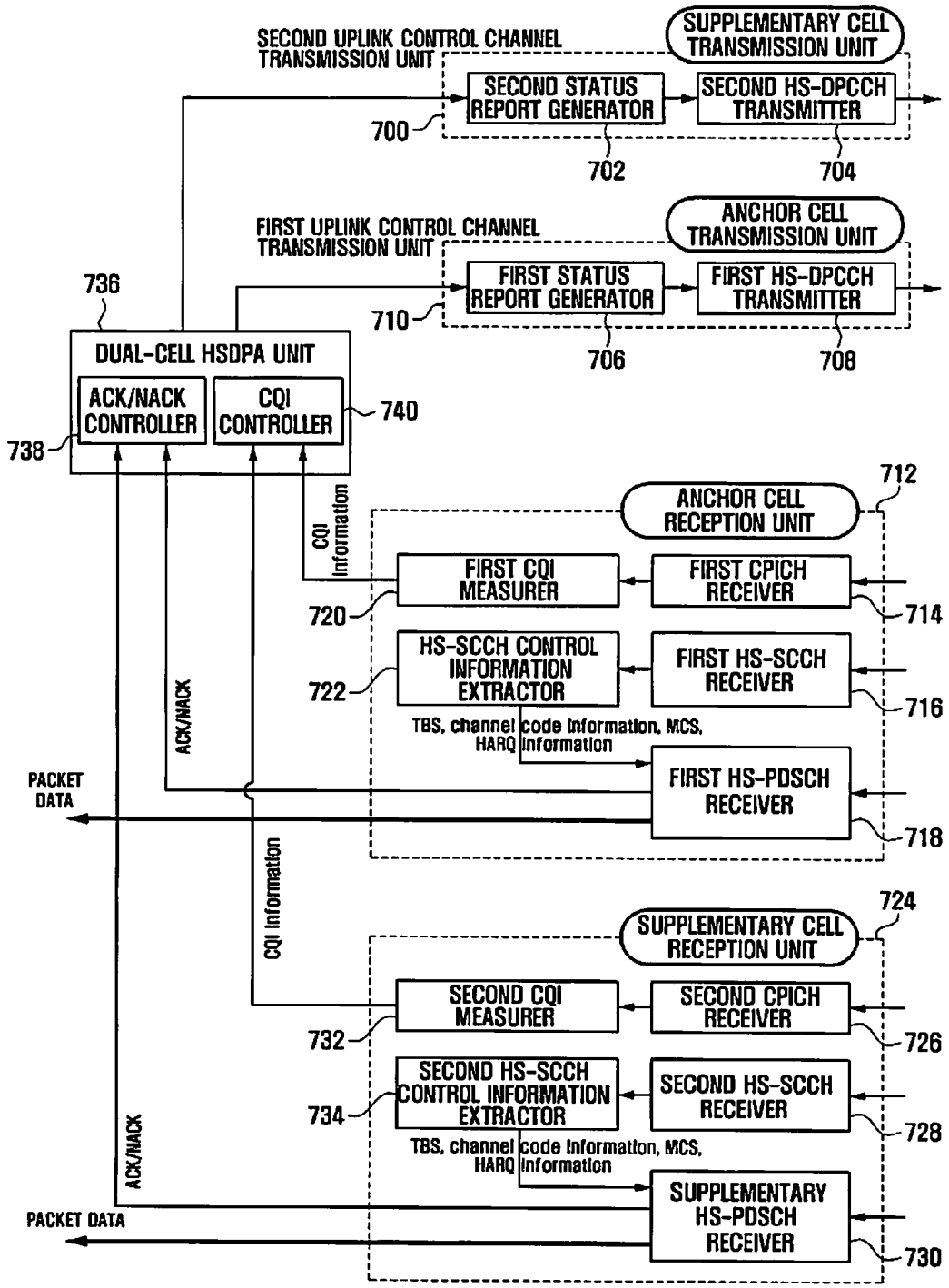
FIG. 7 is a block diagram illustrating a configuration of a UE, according to an embodiment of the present invention.

A configuration of the UE for implementing the CQI reporting method according to an embodiment of the present invention is described hereinafter with reference to FIG. 7. FIG. 7 is a block diagram illustrating a configuration of a UE, according to the first embodiment of the present invention.

As shown in FIG. 7, the UE includes an anchor cell reception unit 712, a supplementary cell reception unit 724, a Dual-Cell HSDPA unit 736, a first uplink control channel transmission unit 710, and a second uplink control channel transmission unit 700. The anchor cell reception unit 712 includes a first CPICH receiver 714, a first HS-SCCH receiver 716, a first HS-PDSCH receiver 718, a first CQI measurer 720, and an HS-SCCH control information extractor 722. The supplementary cell reception unit 724 includes a second CPICH receiver 726, a second HS-SCCH receiver 728, a supplementary HS-PDSCH receiver 730, a second CQI measurer 732, and a second HS-SCCH control information extractor 734. The Dual-Cell HSDPA control unit 736 includes an ACK/NACK controller 738, and a CQI controller 740. The first uplink control channel transmission unit 710 includes a first status report generator 706 and a first HS-DPCCH transmitter 708. The second uplink control channel transmission unit 700 includes a second status report generator 702 and a second HS-DPCCH transmitter 704.

In order for the UE to receive the HSDPA service through two carriers (i.e. two cells), the UE is provided with two HS-SCCH receivers 716 and 728 and two HS-PDSCH receivers 718 and 730. Each of the two HS-SCCH receivers 716 and 728 performs dispreading, demodulation, and decoding on the HS-SCCH through the corresponding cell. Each of the two HS-SCCH information extractor 722 and 734 extracts information on the TBS, channel code information including a number of channel codes, MCS, and HARQ from the decoded HS-SCCH output by the corresponding HS-SCCH receiver, to support the HS-PDSCH reception operation of the corresponding HS-PDSCH receiver. Each of the HS-PDSCH receivers 718 and 730 performs dispreading, demodulating, and decoding the HS-PDSCH transmitted by the corresponding cell into packet data, performs CRC on the packet data, and outputs the CRC result to the ACK/NACK controller 738 of the Dual-Cell HSDPA control unit 736.

Each of the first and second CQI measurers 720 and 732 measures the quality of the CPICH signal received by the corresponding CPICH receiver and outputs the measured channel quality to the CQI controller 740. The Dual-Cell HSDPA control unit 736 (control unit) includes the ACK/NACK controller 738 and the CQI controller 740. The ACK/NACK controller 738 determines whether to transmit ACK/NACK for each cell depending on whether the packet data received through each carrier is erroneous. The CQI controller 740 calculates the difference between CQI(1) for the anchor cell and CQI(2) for the supplementary cell, determines whether the difference between CQI(1) and CQI(2) is less than threshold#1, and transmits one of CQI(1) and CQI (2) when the difference is less than or equal to threshold#1 and both CQI(1) and CQI(2) when the difference is greater than threshold#1 by means of one or both of the first uplink control channel transmission unit 710 and the second uplink control channel transmission unit 700. The first uplink control channel transmission unit 710 includes the first status report generator 706 and the first HS-DPCCH transmitter 708, and the second uplink control channel transmission unit 700 includes the second status report generator 702 and the second HS-DPCCH transmitter 704.

The first and second uplink control channel transmission units 710 and 700 transmit the CQIs and ACK/NACK messages for the respective cells through respective HS-DPCCHs.

Figure 8:
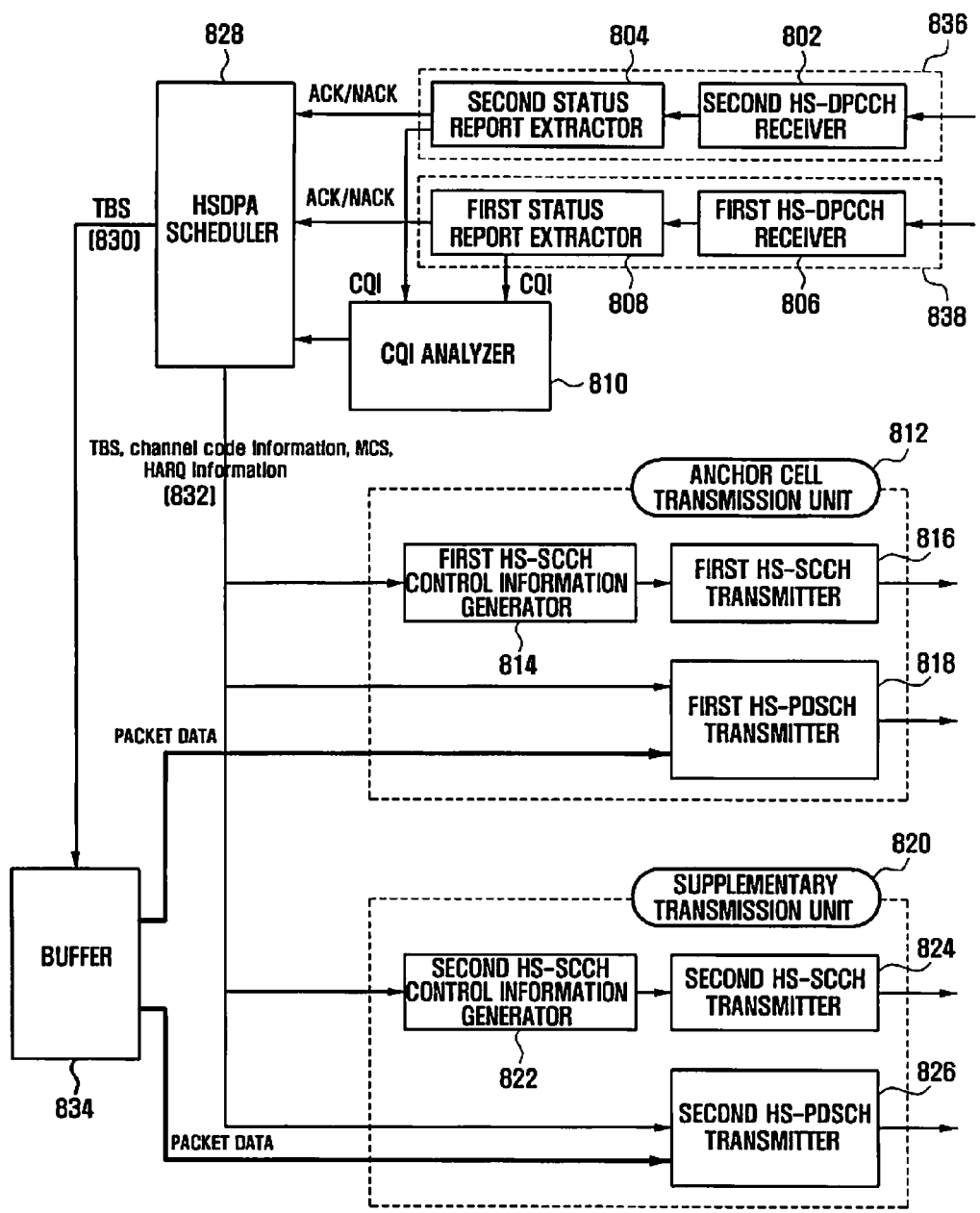
FIG. 8 is a block diagram illustrating a configuration of a Node B, according to an embodiment of the present invention.

A configuration of Node B for implementing the CQI receiving method, according to the first embodiment of the present invention, is described hereinafter with reference to FIG. 8. FIG. 8 is a block diagram illustrating a configuration of a Node B, according to the first embodiment of the present invention. FIG. 8 is depicted under the assumption that Node B uses a common buffer and a common HSDPA scheduler to facilitate supporting the Dual-Cell HSDPA service. As shown in FIG. 8, Node B includes an anchor cell transmission unit 812, a supplementary cell transmission unit 820, a buffer 834, an HSDPA scheduler 828, a CQI analyzer 810, a first uplink control channel reception unit 838, and a second uplink control channel reception unit 836. The anchor cell transmission unit 812 includes a first HS-SCCH control information generator 814, a first HS-SCCH transmitter 816, and a first HS-PDSCH transmitter 818. The supplementary cell transmission unit 820 includes a second HS-SCCH control information generator 822, a second HS-SCCH transmitter 824, and a second HS-PDSCH transmitter 826. The first uplink control channel reception unit 838 includes a first HS-DPCCH receiver 806 and a first status report extractor 808. The second uplink control channel reception unit 836 includes a second HS-DPCCH receiver 802 and a second status report extractor 804.

Referring to FIG. 8, the first and second uplink control channel reception units 838 and 836 receives the ACK/NACK and CQI information transmitted by the UE via the anchor and supplementary carriers. The first and second HS-DPCCH receivers 806 and 802 perform dispreading, demodulation, and decoding the HS-DPCCHs for the respective anchor and supplementary cells and output the decoding results to the corresponding status report extractors 808 and 804. The first and second status report extractors 808 and 804 extract the ACK/NACK and CQI information from the decoded result and output the ACK/NACK information to the HSDPA scheduler 828 and the CQI information to the CQI analyzer 810. The CQI analyzer 810 calculates the CQI values for the anchor and supplementary cells based on the CQI information input by the first and second status report extractors 808 and 804 according to the CQI reception procedure of FIG. 6 and outputs the final CQI values to the HSDPA scheduler 828. The HSDPA scheduler 828 determines the available TBSs, channel codes of HS-PDSCH, number of channel codes, MCS, and HARQ information based on the control information including the ACK/NACK and CQI values input by the first and second status report extractors 808 and 804 and the CQI analyzer 810. The HSDPA scheduler 828 also controls the buffer 834 to output packet data such that the first and second HS-PDSCH transmitters 818 and 826 transmit the packet data to the UE through the anchor and supplementary carriers (anchor and supplementary cells). The HSDPA scheduler 828 also outputs the information on the TBS, channel codes of HS-PDSCH, number of channel codes, MCS, and HARQ to the anchor and supplementary cell transmission units 812 and 820. Such control information is structured in formats appropriate for the respective cells by the first and second HS-SCCH control information generators 814 and 822 and then transmitted by the first and second HS-SCCH transmitters 816 and 824.

Second Embodiment

In a second embodiment of the present invention, the UE operating in Dual-Cell HSDPA mode, in which CQI(1) for the anchor cell and CQI(2) for the supplementary cell are used, compares a difference between the channel conditions or MCS levels of the two downlink channels with a second threshold value (threshold#2) and transmits one of CQI(1) and CQI(2) when the difference is greater than threshold#2 and both CQI(1) and CQI(2) when the difference is less than or equal to threshold#2.

Figure 9:
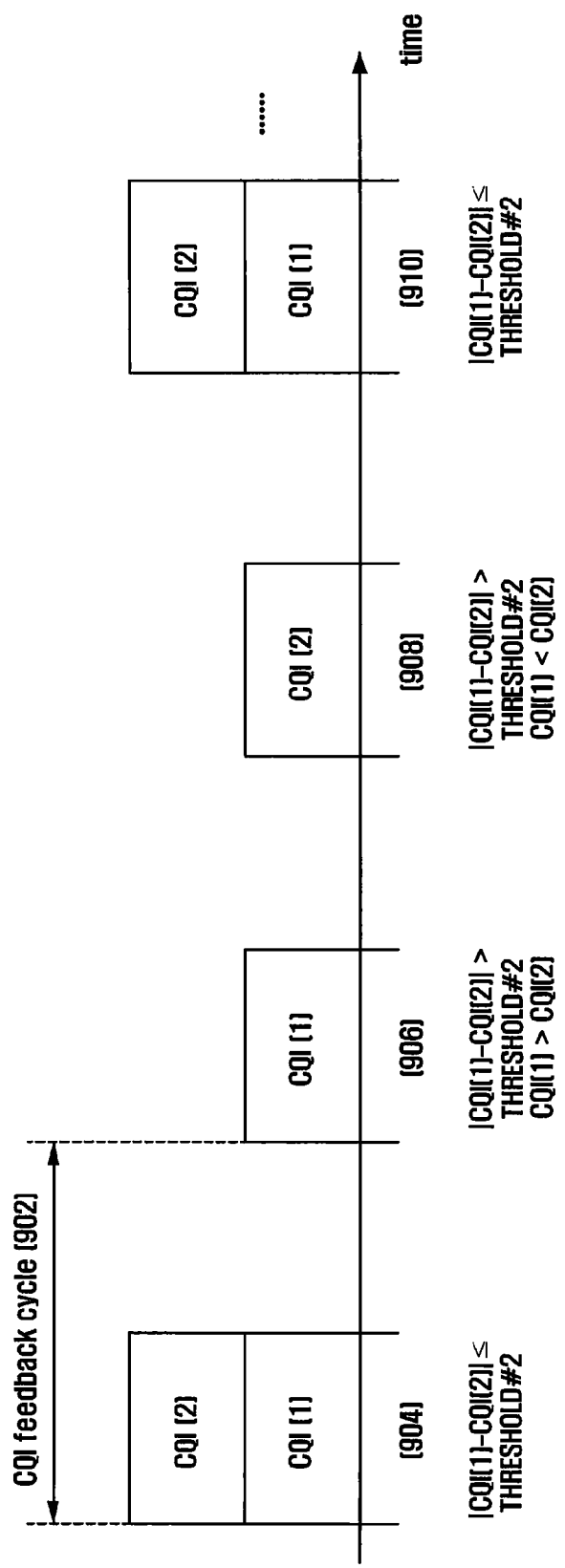
FIG. 9 is a diagram illustrating the CQI reporting method for a Dual-Cell HSDPA service in a mobile communication system, according to another embodiment of the present invention.

The concept of CQI reporting according to the second embodiment of the present invention is described with reference to FIG. 9. FIG. 9 is a diagram illustrating the CQI reporting method for a Dual-Cell HSDPA service in a mobile communication system, according to the second embodiment of the present invention.

In FIG. 9, the CQI feedback cycle can be set by higher layer signaling. The UE first calculates the difference between CQI(1) and CQI 2 and compares the difference with threshold#2 at each CQI feedback time point. At CQI feedback time point 904, the UE determines that the difference is less than or equal to threshold#2. In this case, the UE transmits CQI(1) and CQI(2) to Node B through corresponding physical channels. The CQI is transmitted through a HS-DPCCH, which is an uplink control channel for supporting the HSDPA service. In this embodiment of the present invention, the HS-DPCCH for transmitting CQI(1) is called HS-DPCCH1, and the HS-DPCCH for transmitting CQI(2) is called HS-DPCCH2. HS-DPCCH1 and HS-DPCCH2 can be code-multiplexed or phase-multiplexed.

At CQI feedback time point 906, the UE determines that the difference between CQI(1) and CQI(2) is greater than threshold#2 and transmits CQI 1. This means that the difference between CQI(1) and CQI(2) is considerable and the channel condition or MCS level corresponding to CQI(1) is high compared to that corresponding to CQI(2). In this case, the UE transmits the CQI having a value that is higher than that of the other CQI.

At CQI feedback time point 908, the UE determines that the difference between CQI(1) and CQI(2) is greater than threshold#2 and transmits CQI 2. This means that the difference between CQI(1) and CQI(2) is considerable and the channel condition or MCS level corresponding to CQI(2) is high compared to that corresponding to CQI(1).

At CQI feedback time point 910, the UE determines that the difference between CQI(1) and CQI(2) is less than or equal to threshold#2 and thus transmits both CQI(1) and CQI(2) through the respective HS-DPCCH1 and HS-DPCCH2

Figure 10:
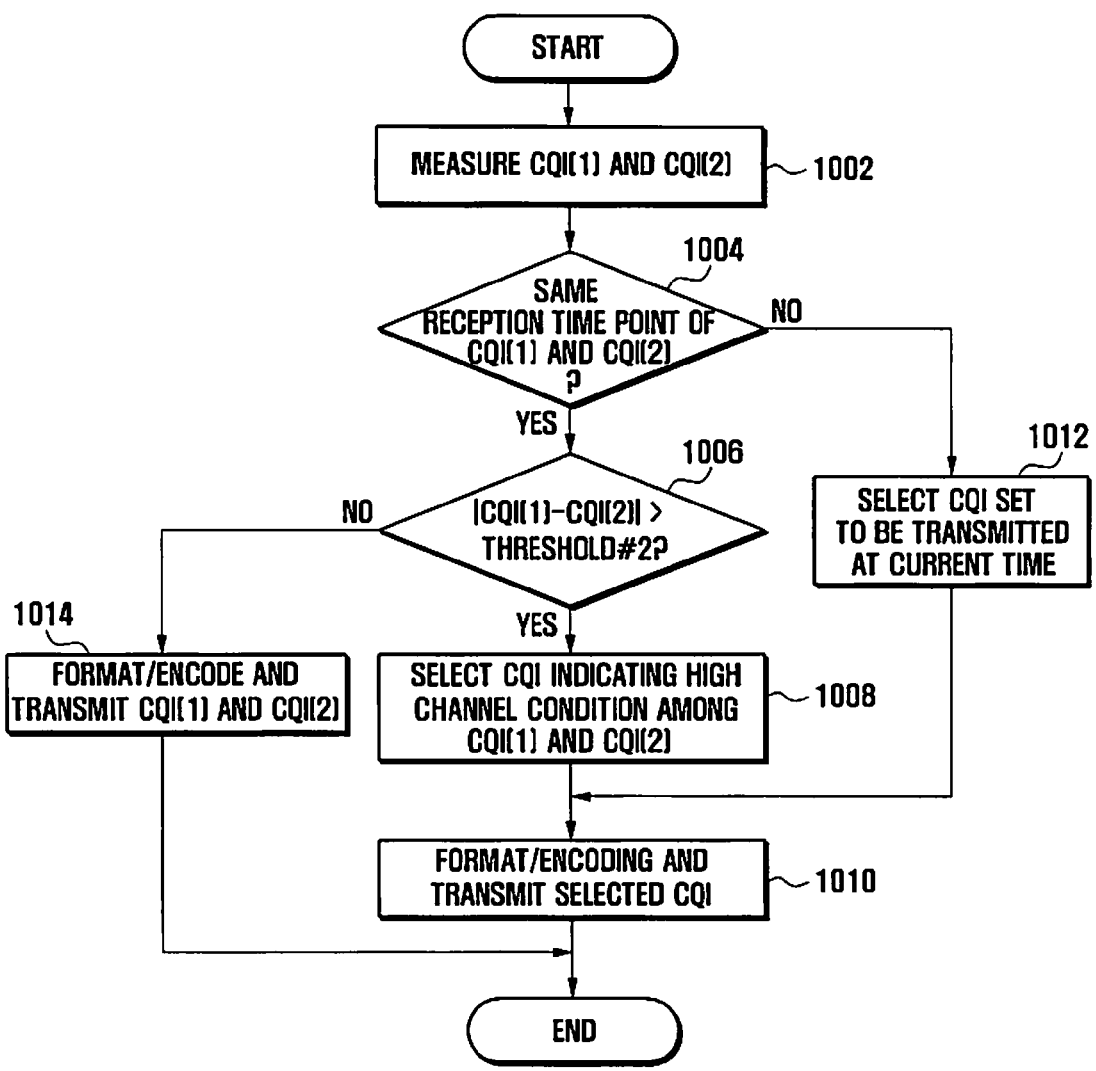
FIG. 10 is a flowchart illustrating a CQI reporting method for a Dual-Cell HSDPA service in a mobile communication system, according to an embodiment of the present invention.

FIG. 10 is a flowchart illustrating a CQI reporting method for a Dual-Cell HSDPA service in a mobile communication system, according to the second embodiment of the present invention.

Referring to FIG. 10, the UE first measures the CPICH powers of the anchor and supplementary cells, determines the channel conditions and MCS levels based on the measurements, and generates CQI(1) and CQI(2) for the anchor and supplementary cells in step 1002. Next, the UE determines whether the transmission time points of CQI(1) and CQI(2) are identical with each other in step 1004. If the transmission time points of CQI(1) and CQI(2) are identical with each other, the UE calculates the difference between CQI(1) and CQI(2) and determines whether the difference is greater than threshold#2 in step 1006. Threshold#2 can be set by higher layer signaling or to a fixed value. If the difference between CQI(1) and CQI(2) is greater than threshold#2, the UE selects one of CQI(1) and CQI(2) in step 1008. The UE selects the CQI having a channel condition that is better or an MCS level that is higher than that of the other CQI for increasing the reception probability of the CQI information. Once one of CQI(1) and CQI(2) is selected, the UE performs formatting and channel encoding on the selected CQI and transmits the encoded CQI through the corresponding HS-DPCCH in step 1010. If the transmission time points of CQI(1) and CQI(2) are different from each other at step 1004, the UE selects the CQI of which a transmission time is reached in step 1012 and transmits the selected CQI after formatting and channel encoding in step 1010. If the difference between CQI(1) and CQI 2 is less than or equal to threshold#2, the UE performs formatting and channel encoding on both CQI(1) and CQI(2) and transmit the channel encoded CQI(1) and CQI(2) through HS-DPCCH1 and HS-DPCCH2 simultaneously. The UE refers to Table 1 to retrieve the CQIs corresponding to the channel conditions measured for the respective cells and determines whether to transmit one or both of the CQIs based on the correlation between the CQI values.

Figure 11:
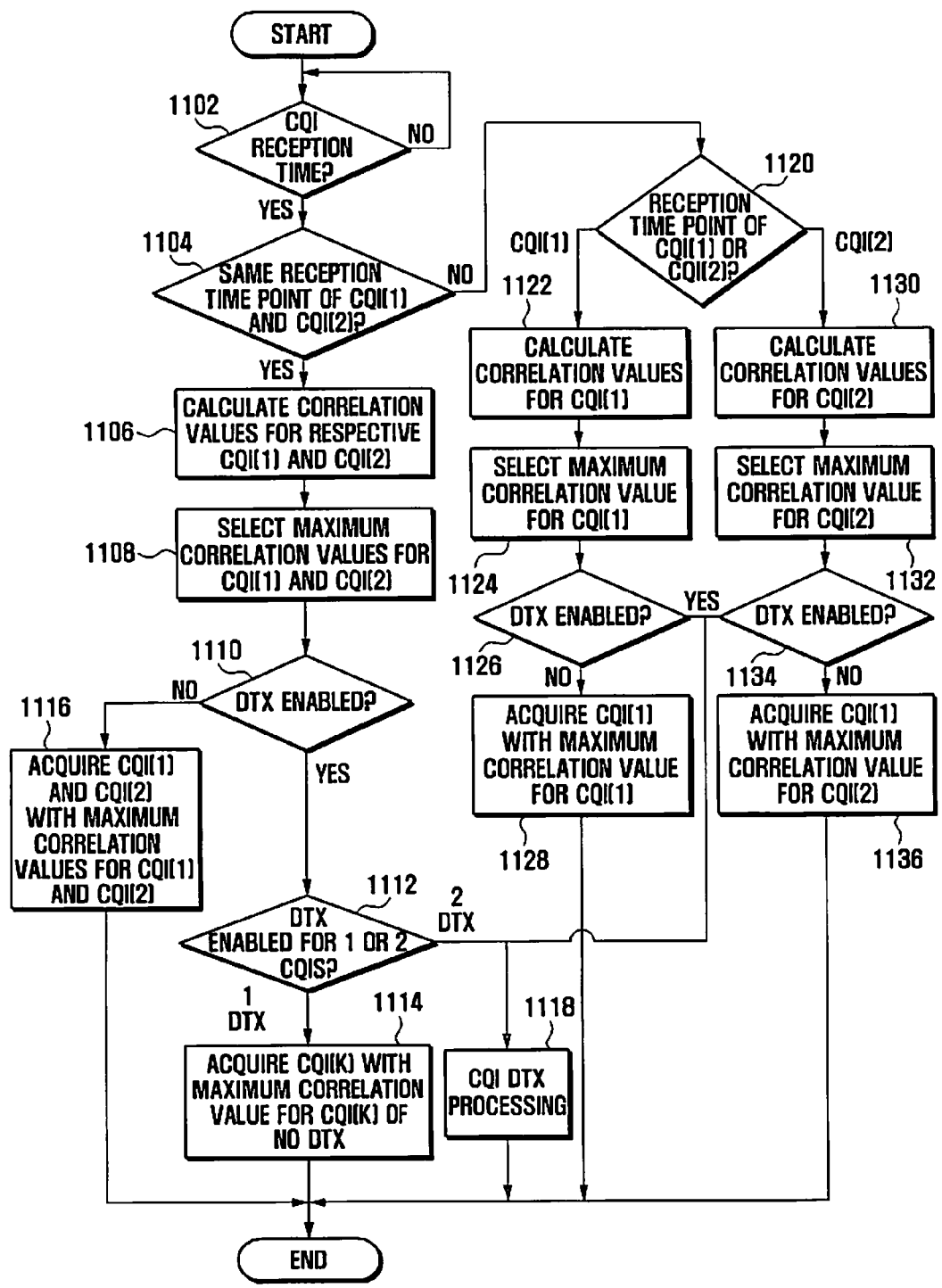
FIG. 11 is a flowchart illustrating a CQI receiving method for a Dual-Cell HSDPA service in a mobile communication system, according to an embodiment of the present invention.

FIG. 11 is a flowchart illustrating a CQI receiving method for a Dual-Cell HSDPA service in a mobile communication system, according to the second embodiment of the present invention. During the Dual-Cell HSDPA operation, the anchor and supplementary cells are defined by two different carriers of a single Node B.

The general CQI reception procedure of the second embodiment is similar to that of the first embodiment depicted in FIG. 6, and the description below is focused on difference between the first and second embodiments. Steps 1102, 1104, 1106, 1108, 1110, 1112, 1116, 1118, 1120, 1122, 1124, 1126, 1128, 1130, 1132, 1134, and 1136 of FIG. 11 are identical with steps 602, 604, 606, 608, 610, 612, 616, 618, 620, 622, 624, 626, 628, 630, 632, 634, and 636 of FIG. 6.

If it is determined that the DTX is enabled for at least one of CQI(1) and CQI(2) at step 1110, Node B determines whether the DTX is enabled for one or both of CQI 1 and CQI(2) in step 112. If it is determined that the DTX is enabled for one of CQI(1) and CQI(2), Node B acquires CQI(k) for which the DTX is disabled using the maximum correlation value of CQI(k) in step 114. If the acquired CQI is CQI(1), Node B determines CQI(1) as the final CQI for the anchor cell and performs the DTX processing on CQI(2). Otherwise, if the acquired CQI is CQI(2), Node B determines CQI(2) as the final CQI for the supplementary cell and performs the DTX processing on CQI(1).

A configuration of the UE for implementing the CQI reporting method, according to the second embodiment of the present invention, is described hereinafter with reference to FIG. 7.

The UE of the second embodiment is identical to the UE of the first embodiment in structure except that the CQI controller 740 transmits the CQI (of CQI(1) and CQI(2)) having a channel condition that is better or an MCS level that is higher than that of the other CQI when the difference between CQI(1) and CQI(2) is greater than threshold#2, and transmits both CQI(1) and CQI(2) when the difference between CQI(1) and CQI(2) is less than or equal to threshold#2, by means of one or both of the first uplink control channel transmission unit 710 and the second uplink control channel transmission unit 700.

A configuration of Node B for implementing the CQI receiving method, according to the second embodiment of the present invention, is described hereinafter with reference to FIG. 8. In the second embodiment, it is assumed that Node B uses a common buffer and a common HSDPA scheduler to facilitate supporting the Dual-Cell HSDPA service. Node B of the second embodiment is identical to Node B of the first embodiment in structure except that the CQI analyzer 810 calculates the CQI values for the anchor and supplementary cells based on the CQI information input by the first and second status report extractors 808 and 804 according to the CQI reception procedure of FIG. 11 and outputs the final CQI values to the HSDPA scheduler 828.

Third Embodiment

In a third embodiment of the present invention, the UE operating in a Dual-Cell HSDPA mode, in which CQI(1) for the anchor cell and CQI(2) for the supplementary cell are used, adjusts the CQI transmit power when the sum of the powers of all physical channels to be transmitted at an instance is greater than a maximum allowable transmit power of the UE.

Figure 12:
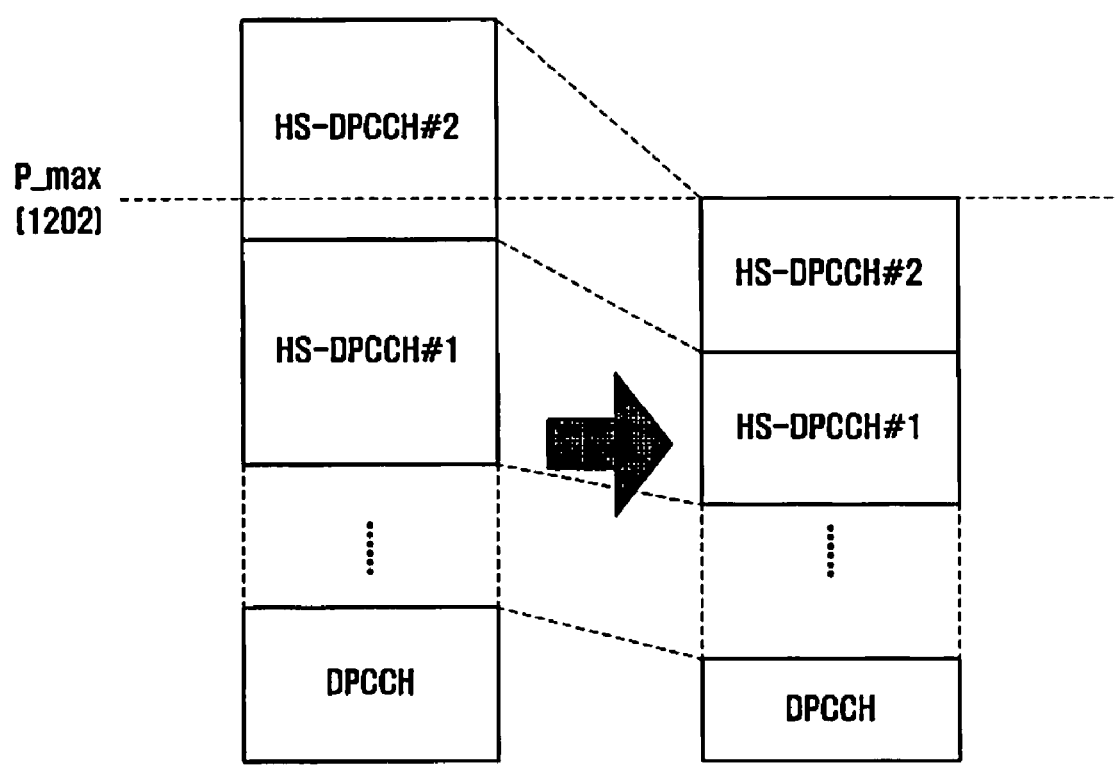
FIG. 12 is a diagram illustrating the conventional CQI transmit power adjustment method of a UE operating in Dual-Cell HSDPA mode.

A conventional CQI transmit power adjustment procedure in the Dual-Cell HSDPA operation is described first with reference to FIG. 12. FIG. 12 is a diagram illustrating the conventional CQI transmit power adjustment method of a UE operating in Dual-Cell HSDPA mode.

Referring to FIG. 12, the UE monitors transmit power conditions and, when the sum of the transmission powers of all physical channels exceed a maximum allowable transmit power (P_max) 1202, the UE decreases the transmission powers of the respective physical channels equally such that the sum of the adjusted transmit powers of all of the physical channels is below P_max. The transmit power (or signal strength) of each physical channel can be expressed as a ratio to the transmit power of DPCCH, which is an uplink pilot channel, and this ratio is maintained before and after the power adjustment. However, the reception reliabilities of the channels can be degraded equally because the priorities of the physical channels are not considered.

Figure 13:
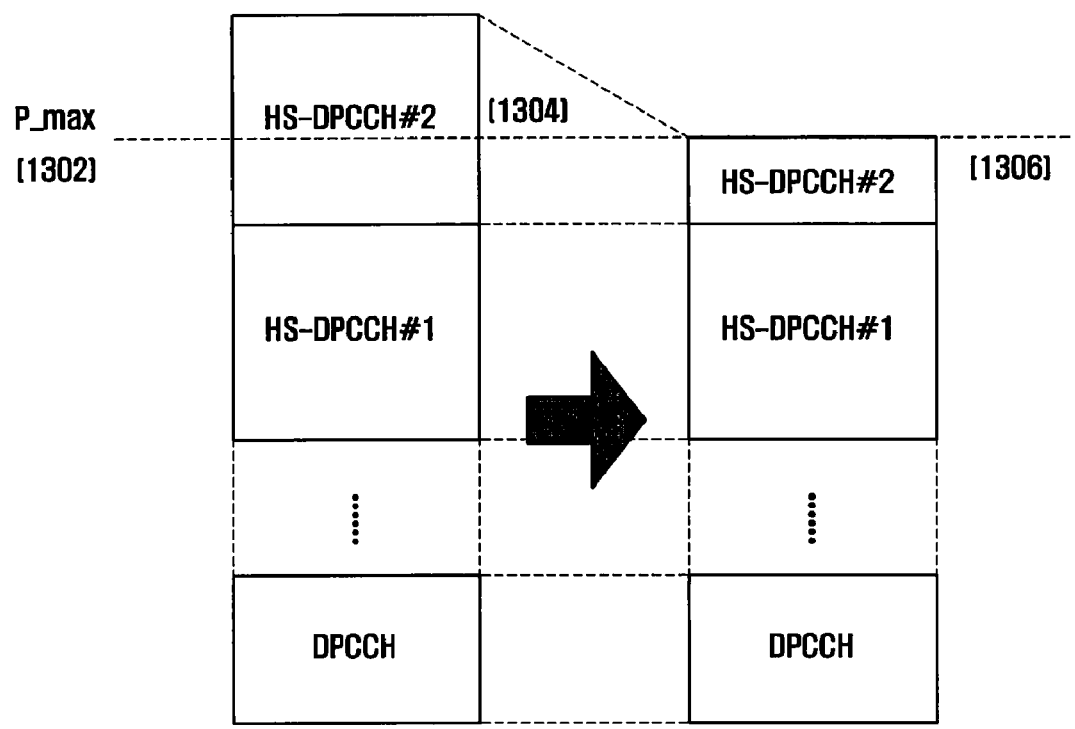
FIG. 13 is a diagram illustrating a CQI transmit power adjustment in a CQI reporting method, according to a further embodiment of the present invention.

FIG. 13 is a diagram illustrating a CQI transmit power adjustment in a CQI reporting method, according to the third embodiment of the present invention.

Referring to FIG. 13, when CQI(1) is set with a high priority at a current point in time and the sum of the transmission powers of all the physical channels exceeds P_max 1302 of the UE, the UE decreases the transmit power (1304, 1306) of the physical channel for transmitting CQI(2) (HS-DPCCH2), of which the priority is low compared to that of CQI(1) such that the sum of the transmission powers of all the physical channels is adjusted below P_max 1302. When the maximum allowable transmit power is not enough, the UE maintains the transmit power of the CQI channel (e.g. HS-DPCCH1) having a channel condition or an MCS level that is relatively high compared to that of the other CQI channel (e.g. HS-DPCCH2) while adjusting the transmit power of the other CQI channel, rather than increasing the reception error probability at the anchor cell by decreasing the transmit powers of the channels for both CQI(1) and CQI(2), and thereby maintaining the CQI error probability for at least one cell, i.e. the anchor cell. The physical channel (HS-DPCCH2) for transmitting CQI(2) having low priority can be disabled rather than decreasing its transmit power.

Figure 14:
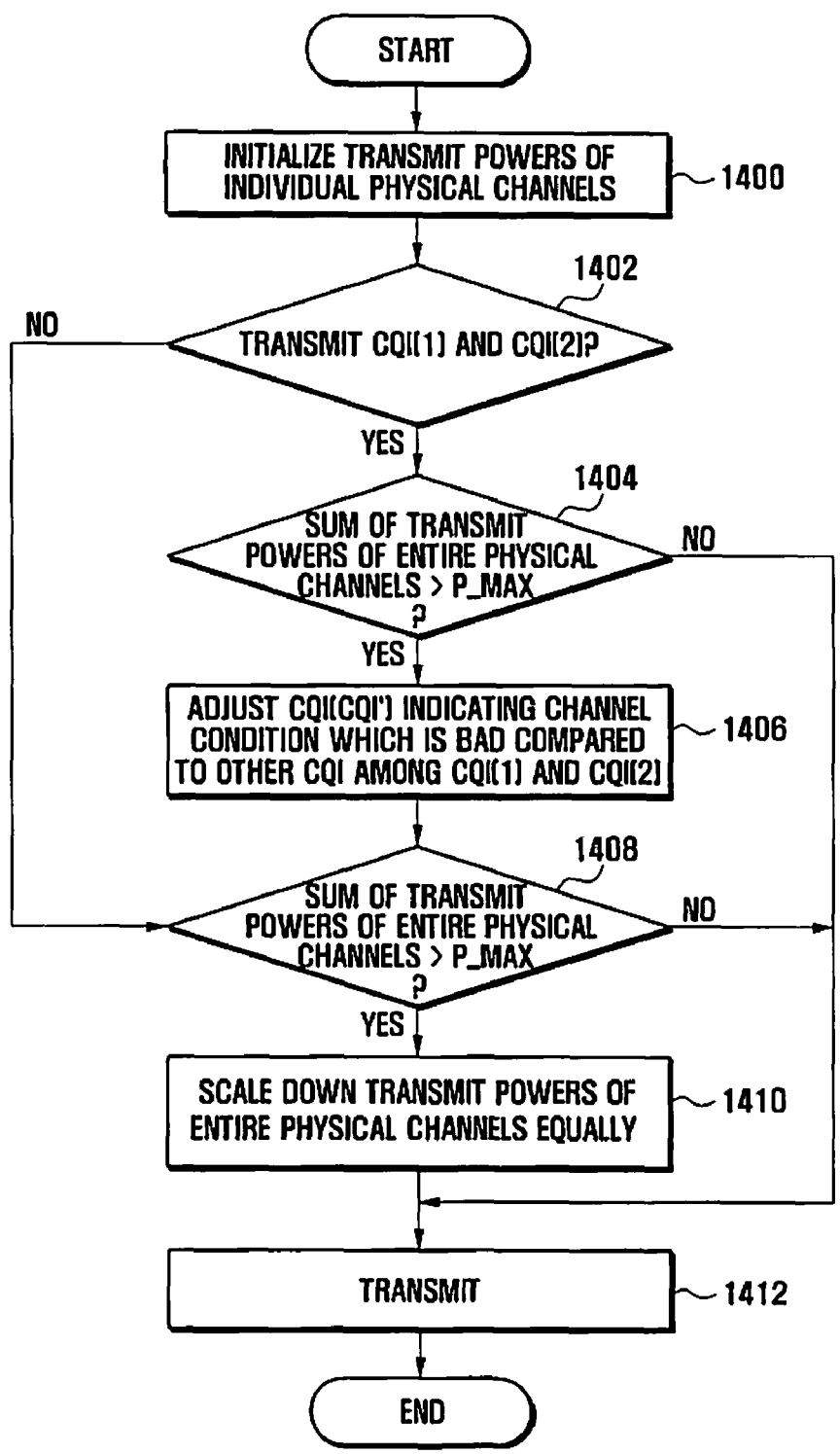
FIG. 14 is a flowchart illustrating a CQI reporting method for Dual-Cell HSDPA service in a mobile communication system, according to an embodiment of the present invention.

FIG. 14 is a flowchart illustrating a CQI reporting method for Dual-Cell HSDPA service in a mobile communication system, according to the third embodiment of the present invention.

Referring to FIG. 14, the UE initializes the transmit powers of the respective physical channels in step 1400. The transmit power (or signal strength) of each physical channel is expressed as a ratio to the transmit power of the DPCCH, which is an uplink pilot channel. The UE determines whether CQI(1) and CQI(2) are required to be transmitted simultaneously in step 1402. If CQI(1) and CQI(2) are required to be transmitted simultaneously, the UE determines whether the sum of the transmit powers of all of the physical channels is greater than P_max in step 1404. If the sum of the transmit powers of all the physical channels is greater than P_max, the UE selects one CQI indicating a bad channel condition from among CQI(1) and CQI(2) compared to that indicated by the other CQI, and adjusts the transmit power of the HS-DPCCH for the selected CQI in step 1406. If the sum of the transmit powers of all the physical channels is not greater than P_max at step 1404, the process proceeds to step 1412. After adjusting the transmit power of the HS-DPCCH for the selected CQI, the UE determines whether the sum of the transmit powers of the all the physical channels including the transmit power-adjusted HS-DPCCH is greater than P_max again in step 1408. If the sum of the transmit powers of all of the physical channels including the transmit power-adjusted HS-DPCCH is greater than P_max, the UE scales down the transmit powers of the physical channels equally (equal scaling) in step 1410 and transmits the physical channels with the equally down-scaled transmit powers in step 1412. If the sum of the transmit powers of all of the physical channels is not greater than P_max at step 1408, the UE transmits the physical channels with the transmit powers reflecting the adjustment of HS-DPCCH in power in step 1412. If CQI(1) and CQI(2) are not required to be transmitted simultaneously at step 1402, the process proceeds at step 1408.

Accordingly, the physical channels, except for the HS-DPCCH carrying the CQI having a low priority, maintain their transmit power ratios to the DPCCH as set initially, but the HS-DPCCH for the CQI having low priority can be adjusted in the transmit power ratio to the DPCCH.

In order to prevent the transmit power of a specific HS-DPCCH from being repeatedly adjusted at each CQI feedback time point, the priorities of CQI(1) and CQI(2) can alternate at every CQI feedback time point.

A configuration of the UE for implementing the CQI reporting method according to the third embodiment of the present invention is described hereinafter with reference to FIG. 7.

The UE of the third embodiment is identical to the UE of the first embodiment in structure except that the CQI controller 740 of the Dual-Cell HSDPA control unit 736 adjusts the transmit power of the HS-SCCH carrying the CQI having relatively low priority first when CQI(1) and CQI(2) are required to be transmitted simultaneously and the sum of the transmit powers of all the physical channels exceeds P_max.

Fourth Embodiment

In a fourth embodiment of the present invention, the UE operating in the Dual-Cell HSDPA mode, in which CQI(1) for the anchor cell and CQI(2) for the supplementary cell are used, adjusts the CQI transmit power, when it is required to transmit the sum of CQI(1) and CQI(2) simultaneously along with an Enhanced Dedicated Physical Data Channel (E-DPDCH), which is an uplink packet data channel, and the sum of the transmit powers of the physical channels to be transmitted at an instance is greater than the maximum allowable transmit power of the UE.

Figure 15:
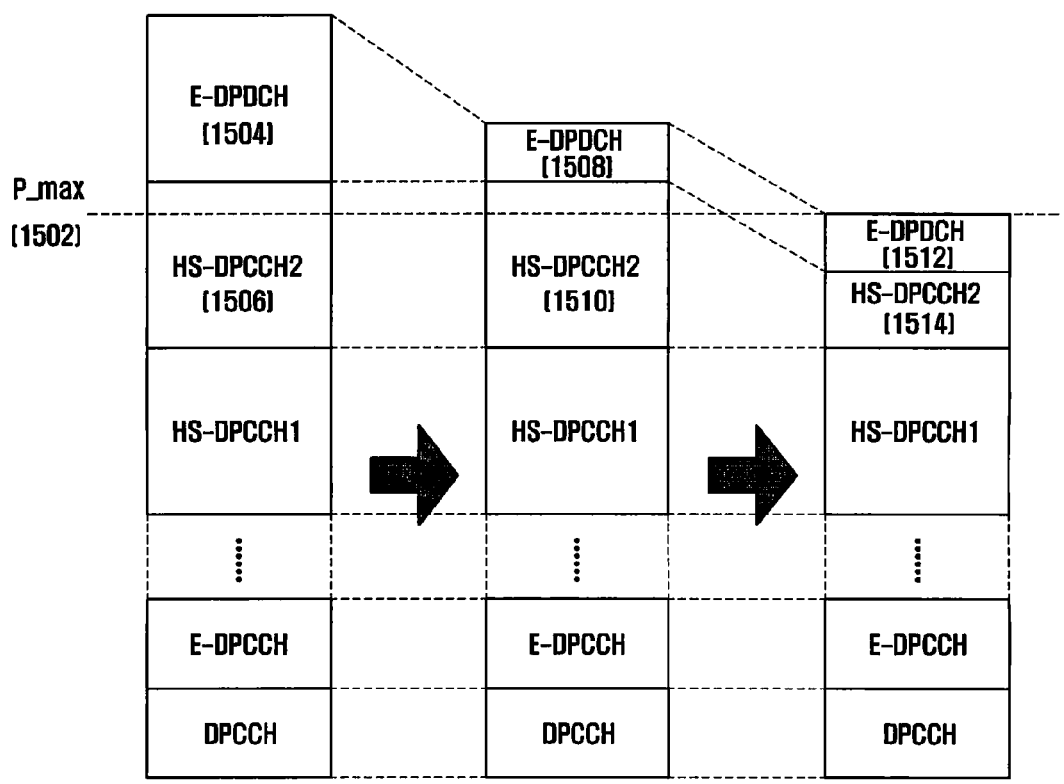
FIG. 15 is a diagram illustrating a CQI transmit power adjustment in a CQI reporting method, according to an additional embodiment of the present invention.

The concept of the CQI transmission power in the CQI reporting method, according to the fourth embodiment of the present invention, is described hereinafter with reference to FIG. 15. FIG. 15 is a diagram illustrating a CQI transmit power adjustment in a CQI reporting method, according to the fourth embodiment of the present invention.

Referring to FIG. 15, when the sum of the transmit powers of all physical channels to be transmitted at an instance is greater than P_max in the aforementioned condition, the UE decreases the transmit power of the E-DPDCH (1504, 1508, and 1512) first such that the sum of the transmit powers of all the physical channels decreases below P_max. HARQ operates such that even when the current transmission fails, the lost data can be recovered through retransmission process. It is possible to reduce the transmit power of the E-DPDCH flexibly compared to other control channels. If the sum of the transmit powers of the physical channels exceeds P_max even after the transmit power of E-DPDCH has been reduced as much as possible, the UE reduces the transmit power of one of the CQI(1) and CQI(2) channels in accordance with priority. For instance, when CQI(1) is set with a priority higher than that of CQI(2), the UE reduces the transmit power of the CQI(2) channel, i.e., HS-DPCCH2, (1506, 1510, and 1514) to adjust the sum of the transmit powers of all the physical channels below P_max. When the maximum allowable transmit power is not enough, the UE maintains the transmit power of the CQI channel having a channel condition that is relatively good or an MCS level that is relatively high compared to that of the other CQI channel, while adjusting the transmit power of the other CQI channel, rather than increasing the reception error probability in the anchor cell by decreasing the transmit powers of the channels for both CQI(1) and CQI(2), and thereby maintaining the CQI error probability for at least one cell in the anchor cell.

Figure 16:
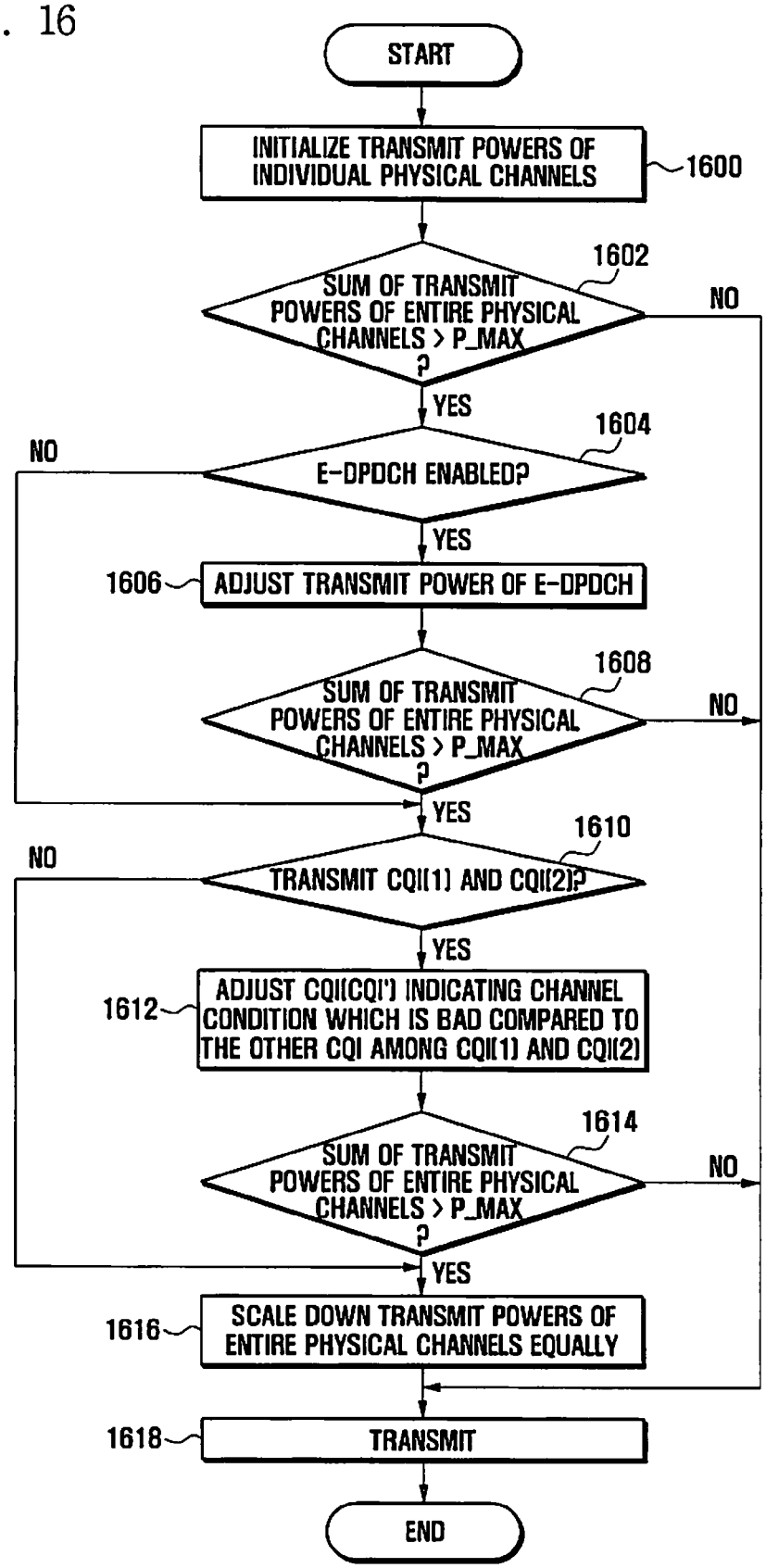
FIG. 16 is a flowchart illustrating a CQI reporting method for Dual-Cell HSDPA service in a mobile communication system, according to an embodiment of the present invention.

FIG. 16 is a flowchart illustrating a CQI reporting method for Dual-Cell HSDPA service in a mobile communication system, according to the fourth embodiment of the present invention.

Referring to FIG. 16, the UE first initializes the transmit powers of the physical channels in step 1600. The transmit power (or signal strength) of each channel is expressed as ratio of the transmit power of the DPCCH. Next, the UE determines whether the sum of the transmit powers of all of the physical channels is greater than P_max in step 1602. If the sum of the transmit powers of all of the physical channels is greater than P_max, the UE determines whether an E-DPDCH is enabled in step 1604. If the E-DPDCH is enabled, the UE adjusts the transmit power of the E-DPDCH in step 1606 and determines whether the sum of the transmit powers of all of the physical channels, including the transmit power-adjusted E-DPDCH, is greater than P_max in step 1608. If the E-DPDCH is disabled, steps 1606 and 1608 are skipped, and the method proceeds at step 1610. If the sum of the transmit powers of all of the physical channels, including the transmit power-adjusted E-DPDCH, is greater than P_max at step 1608, the UE determines whether CQI(1) and CQI(2) are required to be transmitted simultaneously at a current point in time in step 1610. If CQI(1) and CQI(2) are required to be transmitted simultaneously, the UE selects one CQI having a bad channel condition from among CQI(1) and CQI(2) compared to that of the other CQI, and adjusts the transmit power of the HS-DPCCH of the selected CQI in step 1612. Next, the UE determines whether the sum of the transmit powers of all of the physical channels, including the transmit power-adjusted E-DPDCH and HS-DPCCH, is greater than P_max in step 1614. If the sum of the transmit powers of all of the physical channels, including the transmit power-adjusted E-DPDCH and HS-DPCCH, is greater than P_max at step 1614, the UE scales down the transmit powers of the physical channels equally in step 1616 and transmits the physical channels with the equally down-scaled transmit powers in step 1618. If the sum of the transmit powers of all of the physical channels, including the transmit power-adjusted E-DPDCH and HS-DPCCH, is not greater than P_max at step 1614, step 1616 is skipped and the UE transmits the physical channels with the transmit powers reflecting the adjustment of E-DPDCH and HS-PDCCH in step 1618. If CQI(1) and CQI(2) are not required to be transmitted simultaneously at step 1610, steps 1612 and 1614 are skipped and the UE scales down the transmit powers of the respective physical channels equally in step 1616 and transmits the entire physical channels with the equally down-scaled transmit powers in step 1618. If the sum of the transmit powers of all of the physical channels, including the adjusted transmit power of the E-DPDCH, is not greater than P_max at step 1608, steps 1610 to 1616 are skipped and the UE transmits the physical channels with the transmit power reflecting the adjustment of E-DPDCH in step 1618. If the sum of the transmit powers of all of the physical channels is not greater than P_max at step 1602, steps 1604 to 1616 are skipped and the UE transmits the physical channels with initialized transmit powers in step 1618.

In the CQI reporting method according to the fourth embodiment of the present invention, the physical channels, except for the E-DPDCH and the HS-DPCCH for the CQI having low priority, maintain their transmit power ratios to the DPCCH as set initially. The ratios of the E-DPDCH and HS-DPCCH for the CQI having low priory to the DPCCH can be adjusted.

In order to prevent the transmit power of a specific HS-DPCCH from being repeatedly adjusted at every CQI feedback time point, the priorities of CQI(1) and CQI(2) may alternate at each CQI feedback time point.

A configuration of the UE for implementing the CQI reporting method, according to the fourth embodiment of the present invention, is described hereinafter with reference to FIG. 7.

The UE of the fourth embodiment is generally identical with the UE of the first embodiment in structure. Accordingly, the description below is focused on the difference in function. Although not depicted in FIG. 7, when the E-DPDCH is enabled and the sum of the transmit powers of all of the physical channels exceeds P_max of the UE, the UE first adjusts the E-DPDCH. If the sum of the transmit powers of all of the physical channels is greater than P_max after adjusting the transmit power of E-DPDCH, the CQI controller 740 of the Dual-Cell HSDPA control unit 736 determines whether CQI(1) and CQI(2) are required to be transmitted simultaneously and, if it is required, adjusts the transmit power of the HS-DPCCH for the CQI having a low priority from among CQI(1) and CQI(2).

As described above, the CQI reporting method and apparatus of the present invention enables reduction of the CQI transmission overhead in the Dual-Cell HSDPA service of a mobile communication system in which the HSDPA service is provided by multiple cells.

In the first embodiment of the present invention, the UE operating in the Dual-Cell HSDPA mode, with CQI(1) for an anchor cell and CQI(2) for a supplementary cell, transmits only one of CQI(1) and CQI(2) when the difference between CQI(1) and CQI(2) is less than or equal to threshold#1, i.e., the channel conditions or MCS levels indicated by CQI(1) and CQI(2) are similar to each other, and transmits both CQI(1) and CQI(2) when the difference between CQI(1) and CQI(2) is greater than threshold#1.

In the second embodiment of the present invention, the UE operating in the Dual-Cell HSDPA mode, with CQI(1) for an anchor cell and CQI(2) for a supplementary cell, transmits only one of CQI(1) and CQI(2) when the difference between CQI(1) and CQI(2) is greater than threshold#2, i.e. the channel conditions or MCS levels indicated by CQI(1) and CQI(2) are considerably different from each other, and transmits both CQI(1) and CQI(2) when the difference between CQI(1) and CQI(2) is less than or equal to threshold#2.

In the third embodiment of the present invention, the UE operating in the Dual-Cell HSDPA mode, with CQI(1) for an anchor cell and CQI(2) for a supplementary cell, adjusts the transmit power of the physical channel for the CQI having a low priority among CQI(1) and CQI(2), when the sum of transmit powers of all of the uplink physical channels exceeds P_max of the UE at an instant, in order for the sum of the transmit powers to be below P_max.

In the fourth embodiment of the present invention, the UE operating in the Dual-Cell HSDPA mode, with CQI(1) for an anchor cell and CQI(2) for a supplementary cell, determines whether an E-DPPCH is enabled and adjusts, if the E-DPPCH is enabled, the transmit power of the E-DPPCH when the sum of the transmit powers of all of the uplink physical channels is greater than P_max of the UE at an instance.

Although the CQI reporting methods and apparatuses are described with the Dual-Cell HSDPA service in which the HSDPA service is provided by means of two cells, the present invention is not limited thereto. For example, the CQI reporting methods and apparatuses of the present invention can be applied to the HSDPA services implemented with more than two carriers (cells). Also, the control information fed back to Node B periodically can include other information such as Multiple-Input Multiple-Out (MIMO) control information as well as the CQI information.

As described above, the CQI reporting methods and apparatuses of the present invention are advantageous in reducing CQI transmission overhead of the UE receiving a Dual-Cell HSDPA service of a mobile communication system, thereby securing the uplink coverage and reducing power consumption of the UE.

While the invention has been shown and described with reference to certain embodiments thereof, it will be understood by those skilled in the art that various changes in form and detail may be made therein without departing from the spirit and scope of the present invention, as defined in the appended claims.

What is claimed is:

1. A method for reporting channel quality indicators for downlink channels at a user equipment in a mobile communication system, comprising the steps of:
   measuring a channel quality of a first downlink channel and a channel quality of a second downlink channel;
   comparing a predetermined threshold value with a difference between the channel quality of the first downlink channel and the channel quality of the second downlink channel;
   selecting at least one of the channel quality of the first downlink channel and the channel quality of the second downlink channel based on a result of the comparison; and
   transmitting one or more channel quality indicators indicating the at least one selected channel quality.

2. The method of claim 1, wherein selecting at least one of the channel quality of the first downlink channel and the channel quality of the second downlink channel comprises:
   when the difference between the channel quality of the first downlink channel and the channel quality of the second downlink channel is less than or equal to the predetermined threshold value, selecting the channel quality of the first downlink channel or the channel quality of the second downlink channel; and
   when the difference between the channel quality of the first downlink channel and the channel quality of the second downlink channel is greater than the predetermined threshold value, selecting both the channel quality of the first downlink channel and the channel quality of the second downlink channel.

3. The method of claim 2, wherein selecting the channel quality of the first downlink channel or the channel quality of the second downlink channel comprises selecting the channel quality which is low compared to the other channel quality.

4. The method of claim 1, wherein selecting at least one of the channel quality of the first downlink channel and the channel quality of the second downlink channel comprises:
   when the difference between the channel quality of the first downlink channel and the channel quality of the second downlink channel is greater than the predetermined threshold value, selecting the channel quality of the first downlink channel or the channel quality of the second downlink channel; and
   when the difference between the channel quality of the first downlink channel and the channel quality of the second downlink channel is less than or equal to the predetermined threshold value, selecting both the channel quality of the first downlink channel and the channel quality of the second downlink channel.

5. The method of claim 4, wherein selecting the channel quality of the first downlink channel or the channel quality of the second downlink channel comprises selecting the channel quality which is high compared to the other channel quality.

6. The method of claim 1, wherein transmitting one or more channel quality indicators comprises:
   comparing a sum of transmit powers of uplink channels with a maximum allowable transmit power;
   when the sum of transmit powers of uplink channels is greater than the maximum allowable transmit power, adjusting a transmit power of at least one of the one or more channel quality indicators; and
   transmitting the one or more channel quality indicators with the adjusted transmit power.

7. The method of claim 6, wherein adjusting the transmit power of the at least one of the one or more channel quality indicators comprises reducing the transmit power of a channel quality indicator indicating a channel quality which is low compared to channel quality of the other channel quality indicator.

8. The method of claim 7, wherein adjusting the transmit power of the at least one of the one or more channel quality indicators comprises:
   after reducing the transmit power of the channel quality indicator indicating the channel quality which is low compared to channel quality of the other channel quality indicator, comparing the sum of the transmit powers of the uplink channels with the maximum allowable transmit power; and when the sum of the transmit powers of the uplink channels is greater than the maximum allowable transmit power, scaling down the transmit powers of the uplink channels equally.

9. The method of claim 6, wherein adjusting the transmit power of the at least one of the one or more channel quality indicators comprises reducing the transmit power of an uplink packet data channel.

10. A method for receiving channel quality indicators for downlink channels in a mobile communication system, comprising the steps of:

when at least one channel quality indicator is received, selecting maximum correlation values of channel quality indicators for a first uplink channel and a second uplink channel;

determining whether a Discontinuous Transmission is enabled for the maximum correlation value of each channel quality indicator;

when the Discontinuous Transmission is enabled for the maximum correlation values of both channel quality indicators, acquiring the channel quality indicators for the first and second uplink channels with the maximum correlation values;

when the Discontinuous Transmission is enabled for one maximum correlation value, acquiring the channel quality indicators for the first and second uplink channels with the maximum correlation value for which Discontinuous Transmission is disabled; and scheduling data in accordance with the acquired channel quality indicators.

11. A user equipment for transmitting channel quality indicators for downlink channels in a mobile communication system, comprising:

a first measurer which measures a channel quality for a first downlink channel;

a second measurer which measures a channel quality for a second downlink channel;

a channel quality indicator controller which compares a predetermined threshold value with a difference between the channel quality for the first downlink channel measured by the first measurer and the channel quality for the second downlink channel measured by the second measurer and selects at least one of the channel quality for the first downlink channel and the channel quality for the second downlink channel according to a result of the comparison; and a control channel transmitter which transmits one or more channel quality indicators indicating the at least one channel selected quality.

12. The user equipment of claim 11, wherein the channel quality indicator controller selects the channel quality of the first downlink channel or the channel quality of the second downlink channel, when the difference between the channel quality of the first downlink channel and the channel quality of the second downlink channel is less than or equal to the predetermined threshold value, and selects both the channel quality of the first downlink channel and the channel quality of the second downlink channel, when the difference between the channel quality of the first downlink channel and the channel quality of the second downlink channel is greater than the predetermined threshold value.

13. The user equipment of claim 12, wherein the channel quality indicator controller selects the channel quality which is low compared to the other channel quality, when the difference between the channel quality of the first downlink channel and the channel quality of the second downlink channel is less than or equal to the predetermined threshold value.

14. The user equipment of claim 11, wherein the channel quality indicator controller selects the channel quality of the first downlink channel or the channel quality of the second downlink channel, when the difference between the channel quality of the first downlink channel and the channel quality of the second downlink channel is greater than the predetermined threshold value, and selects both the channel quality of the first downlink channel and the channel quality of the second downlink channels, when the difference between the channel quality of the first downlink channel and the channel quality of the second downlink channel is less than or equal to the predetermined threshold value.

15. The user equipment of claim 14, wherein the channel quality indicator controller selects the channel quality which is high compared to the other channel quality, when the difference between the channel quality of the first downlink channel and the channel quality of the second downlink channel is greater than the predetermined threshold value.

16. The user equipment of claim 11, wherein the channel quality indicator controller compares a sum of transmit powers of uplink channels with a maximum allowable transmit power, adjusts the transmit power of at least one of the one or more channel quality indicators, when the sum of transmit powers of uplink channels is greater than the maximum allowable transmit power, and transmits the one or more channel quality indicators with the adjusted transmit power.

17. The user equipment of claim 16, wherein the channel quality indicator controller reduces the transmit power of a channel quality indicator indicating a channel quality which is low compared to channel quality of the other channel quality indicator, when the sum of transmit powers of uplink channels is greater than the maximum allowable transmit power.

18. The user equipment of claim 17, wherein after reducing the transmit power of the channel quality indicator indicating the channel quality which is low compared to the channel quality of the other channel quality indicator, the channel quality indicator controller compares the sum of the transmit powers of the uplink channels with the maximum allowable transmit power, and scales down the transmit powers of the uplink channels equally, when the sum of the transmit powers of the uplink channels is greater than the maximum allowable transmit power.

19. The user equipment of claim 16, wherein the channel quality indicator controller reduces the transmit power of an uplink packet data channel, when the sum of transmit powers of uplink channels is greater than the maximum allowable transmit power.

20. An apparatus for receiving channel quality indicators for downlink channels in a mobile communication system, comprising:

a detector which detects a channel quality indicator for a first uplink channel and a channel quality indicator for a second uplink channel;

a channel quality indicator analyzer which receives the detected channel quality indicators, selects a maximum correlation value of the channel quality indicator for the first uplink channel and a maximum correlation value of the channel quality indicator for the second uplink channel, acquires the channel quality indicators for the first and second uplink channels with the maximum correlation values, when Discontinuous Transmission is enabled for the maximum correlation values of both channel quality indicators, and acquires the channel quality indicator for the uplink channel with the maximum correlation value for which Discontinuous Transmission is disabled, when the Discontinuous Transmission is enabled for one maximum correlation value; and a scheduler which schedules data in accordance with the acquired channel quality indicators.

* * * * *